US012515674B2

(12) United States Patent
Inaba et al.

(10) Patent No.: US 12,515,674 B2
(45) Date of Patent: Jan. 6, 2026

(54) VEHICLE CONTROL DEVICE FOR SUPPRESSING UNNECESSARY LANE-CHANGE OPERATION

(71) Applicant: HITACHI ASTEMO, LTD., Hitachinaka (JP)

(72) Inventors: Ryoh Inaba, Tokyo (JP); Yuki Horita, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 212 days.

(21) Appl. No.: 18/252,967

(22) PCT Filed: Aug. 31, 2021

(86) PCT No.: PCT/JP2021/031904
§ 371 (c)(1),
(2) Date: May 15, 2023

(87) PCT Pub. No.: WO2022/130701
PCT Pub. Date: Jun. 23, 2022

(65) Prior Publication Data
US 2023/0415749 A1 Dec. 28, 2023

(30) Foreign Application Priority Data
Dec. 18, 2020 (JP) ................................ 2020-210520

(51) Int. Cl.
*B60W 40/06* (2012.01)
*B60W 30/08* (2012.01)
(Continued)

(52) U.S. Cl.
CPC ............ *B60W 40/06* (2013.01); *B60W 30/08* (2013.01); *B60W 30/18163* (2013.01);
(Continued)

(58) Field of Classification Search
None
See application file for complete search history.

(56) References Cited

U.S. PATENT DOCUMENTS 12,377,842 B2 * 8/2025 Noma ................ B60W 30/095
2019/0106104 A1 4/2019 Inoue et al.
(Continued)

FOREIGN PATENT DOCUMENTS

JP 2005-122260 A 5/2005
JP 2018-062261 A 4/2018
(Continued)

OTHER PUBLICATIONS

International Search Report with English Translation and Written Opinion of International Patent Application No. PCT/JP2021/031904 dated Oct. 12, 2021 (9 pages).
(Continued)

*Primary Examiner* — David P. Merlino
(74) *Attorney, Agent, or Firm* — Foley & Lardner LLP

(57) ABSTRACT

A vehicle control device includes a peripheral state detection sensor and one or more controllers. The peripheral state detection sensor detects a peripheral state of a host vehicle. The one or more controllers calculate a blind-spot region around the host vehicle based on the peripheral state of the host vehicle and estimate an object existing in the calculated blind-spot and a behavior trend of the object. The one or more controllers generate a region having a potential risk that the host vehicle approaches the object. The one or more controllers generate a lane-change trajectory of the host vehicle, compare the generated lane-change trajectory with a potential risk map, and determine whether or not lane change of this host vehicle is possible. The one or more controllers control an operation of the host vehicle in accordance with the determination of whether or not the lane change is possible.

5 Claims, 22 Drawing Sheets

(51) Int. Cl.
B60W 30/18 (2012.01)
G08G 1/16 (2006.01)

(52) U.S. Cl.
CPC ......... G08G 1/167 (2013.01); B60W 2520/10 (2013.01); B60W 2552/10 (2020.02); B60W 2554/4046 (2020.02); B60W 2556/40 (2020.02)

(56) References Cited

U.S. PATENT DOCUMENTS

| | | | |
|---|---|---|---|
| 2019/0382013 A1 | 12/2019 | Li et al. | |
| 2020/0079364 A1* | 3/2020 | Min | B60W 30/18163 |
| 2020/0180638 A1* | 6/2020 | Kanoh | B60W 30/095 |
| 2020/0264622 A1* | 8/2020 | Tokumochi | G05D 1/0221 |
| 2021/0197811 A1* | 7/2021 | Tsushima | G08G 1/167 |
| 2022/0242403 A1 | 8/2022 | Horita et al. | |
| 2023/0015466 A1* | 1/2023 | Jiralerspong | B60W 40/105 |
| 2023/0118619 A1* | 4/2023 | Horihata | G06T 7/70 340/937 |

FOREIGN PATENT DOCUMENTS

| | | |
|---|---|---|
| JP | 2019-069659 A | 5/2019 |
| JP | 2019-214318 A | 12/2019 |
| JP | 2020-194309 A | 12/2020 |
| WO | WO-2016104198 A1 * | 6/2016 |

OTHER PUBLICATIONS

English Translation of International Preliminary Report on Patentability and Written Opinion issued in International Patent Application No. PCT/JP2021/031904 dated Jun. 29, 2023 (6 pages).

* cited by examiner

VEHICLE CONTROL DEVICE FOR SUPPRESSING UNNECESSARY LANE-CHANGE OPERATION

TECHNICAL FIELD

The present invention relates to a vehicle control device having a function of generating a target trajectory of a vehicle such as an automobile, particularly, a host vehicle during automatic driving travel and controlling following of the target trajectory.

BACKGROUND ART

Conventionally, there has been developed a system that acquires object information around a host vehicle, plans a driving behavior of the host vehicle based on the acquired object information and map information, generates a trajectory based on the planned driving behavior, and controls following of the generated trajectory (see, for example, PTL 1).

In addition, in a road environment where there is a blind spot such as a residential area, there has been developed a method for realizing more stable automatic driving by predicting a type of an object hidden in the blind spot based on near miss data and predicting jumping out of the object (see, for example, PTL 2).

CITATION LIST

Patent Literature

PTL 1: JP 2018-62261 A
PTL 2: JP 2019-069659 A

SUMMARY OF INVENTION

Technical Problem

However, in the concept of lane change in the prior art, sudden deceleration is required when an object actually jumps out from a blind spot of the object, and there is a possibility that ride comfort is deteriorated.

An object of the present invention is to realize a vehicle control device capable of suppressing an unnecessary lane-change operation of a host vehicle and suppressing deterioration of ride comfort.

Solution to Problem

In order to achieve the above object, the present invention is configured as follows.

A vehicle control device includes a peripheral state detection sensor that detects a peripheral state of a host vehicle, a blind-spot object estimation processing unit that calculates a blind-spot region around the host vehicle based on the peripheral state of the host vehicle detected by the peripheral state detection sensor and a feature amount extracted from map information, and estimates an object existing in the calculated blind-spot region and a behavior trend of the object, a potential risk map generation unit that generates a region having a potential risk that the host vehicle approaches the object, based on the behavior trend of the object estimated by the blind-spot object estimation processing unit, an automatic driving planning unit that generates a lane-change trajectory of the host vehicle from the peripheral state of the host vehicle and the map information, compares the generated lane-change trajectory with a potential risk map, and determines whether or not lane change of the host vehicle is possible, and a vehicle motion control unit that controls an operation of the host vehicle in accordance with the determination on whether or not the lane change is possible by the automatic driving planning unit.

Advantageous Effects of Invention

According to the present invention, it is possible to realize a vehicle control device capable of suppressing an unnecessary lane-change operation of a host vehicle and suppressing deterioration of ride comfort. Other configurations, operations, and effects of the present invention will be described in detail in the following embodiments.

DESCRIPTION OF EMBODIMENTS

Hereinafter, embodiments of the present invention will be described in detail with reference to the drawings.

EMBODIMENTS

Embodiment 1

Figure 1:
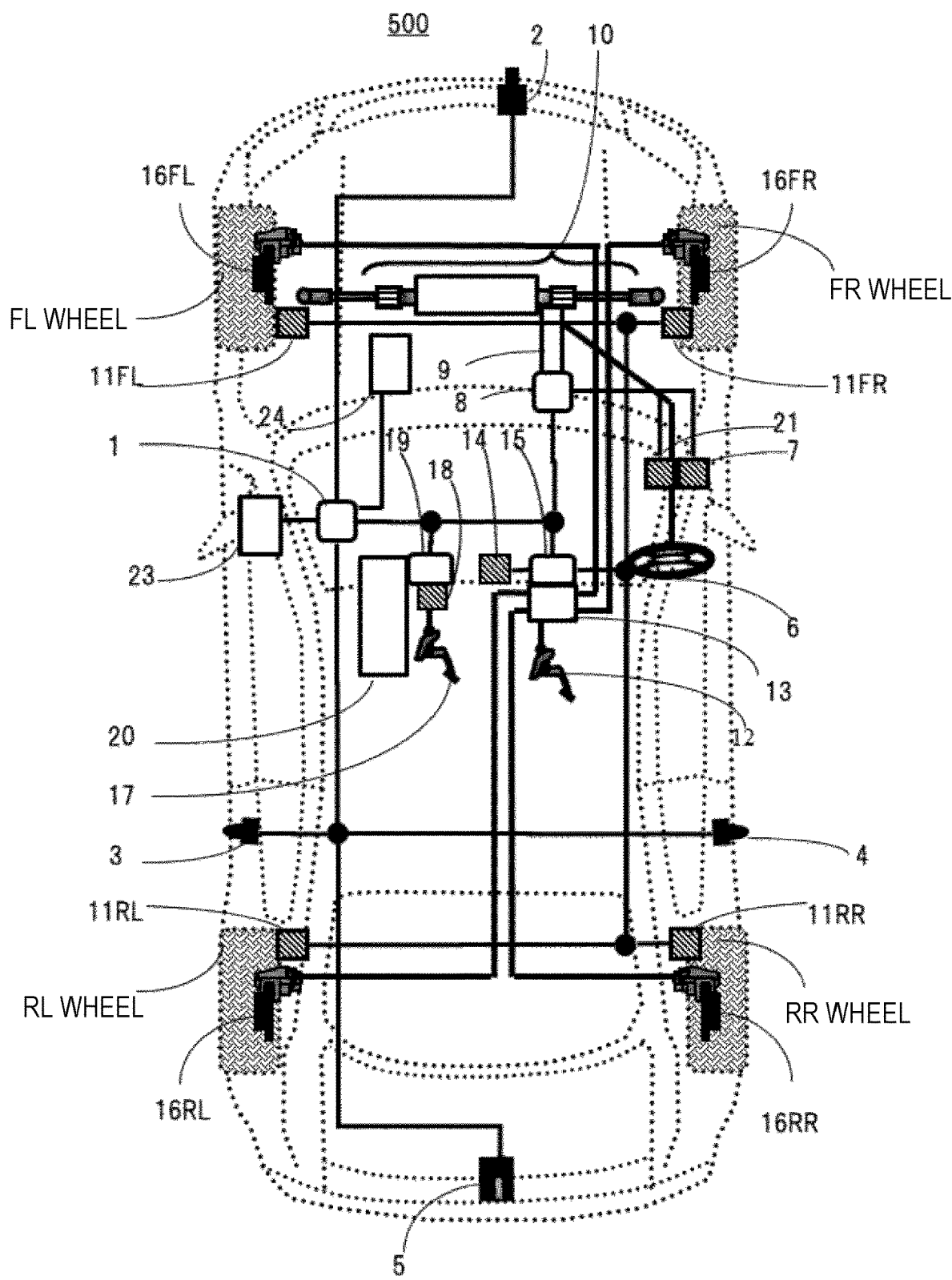
FIG. 1 is an explanatory diagram illustrating an overall configuration of a vehicle equipped with a vehicle control device according to Embodiment 1.

FIG. 1 is an explanatory diagram illustrating an overall configuration of a vehicle 500 equipped with a vehicle control device 1 according to Embodiment 1 of the present invention.

In FIG. 1, an FL wheel means a left front wheel, an FR wheel means a right front wheel, an RL wheel means a left rear wheel, and an RR wheel means a right rear wheel.

The vehicle 500 includes a vehicle control device 1 that calculates command values for a steering control mechanism 10, a brake control mechanism 13, and a throttle control mechanism 20 that are provided for controlling a traveling direction of the vehicle 500 based on information from sensors 2, 3, 4, and 5 that recognize an external environment.

In addition, the vehicle 500 includes a steering control device 8 that controls the steering control mechanism 10 based on a command value from the vehicle control device 1, a brake control device 15 that controls the brake control mechanism 13 based on a command value from the vehicle control device 1 to adjust the braking force distribution of each wheel, an acceleration control device 19 that controls the throttle control mechanism 20 based on a command value from the vehicle control device 1 to adjust a torque output of an engine, and a display device 24 that displays a travel plan of the vehicle 500, a behavior prediction of a moving object existing in the periphery, and the like.

The sensors 2, 3, 4, and 5 that recognize the external environment are a camera 2 on the front side, laser radars 3 and 4 on the left and right sides, and a millimeter wave radar 5 on the rear side, and can detect the relative distance and the relative speed between the vehicle 500 that is the host vehicle and the surrounding vehicle. The vehicle 500 further includes a communication device 23 that performs road-to-vehicle or vehicle-to-vehicle communication. Note that a combination of the above sensors is described as an example of the sensor configuration in Embodiment 1, but the present embodiment is not limited thereto. A combination with an ultrasonic sensor, a stereo camera, an infrared camera, or the like may be used. A signal of the sensor is input to the vehicle control device 1.

Although not illustrated in detail in FIG. 1, the vehicle control device 1 includes, for example, a CPU, a ROM, a RAM, and an input/output device. The ROM stores a flow of vehicle travel control described below. Although details will be described later, the vehicle control device 1 calculates command values of the steering control mechanism 10, the brake control mechanism 13, and the throttle control mechanism 20, which are actuators for controlling the vehicle travel in accordance with the generated travel plan. The steering control device 8, the brake control device 15, and the acceleration control device 19 that are control devices of the steering control mechanism 10, the brake control mechanism 13, and the throttle control mechanism 20 receive the command values of the vehicle control device 1 by communication, and control each actuator based on the command value.

Next, the operation of the brake will be described. In a state where a driver drives the vehicle 500, a stepping force of the driver stepping on a brake pedal 12 is boosted by a brake booster (not illustrated), and hydraulic pressure corresponding to the boosted force is generated by a master cylinder (not illustrated). The generated hydraulic pressure is supplied to wheel cylinders 16FL, 16FR, 16RL, and 16RR via the brake control mechanism 13.

The wheel cylinders 16FL, 16FR, 16RL, and 16RR include a cylinder (not illustrated), a piston, a pad, and the like. The piston is propelled by a hydraulic fluid supplied from the master cylinder 9, and the pad connected to the piston is pressed on a disk rotor. Note that the disk rotor rotates together with wheels (not illustrated). Therefore, the brake torque acting on the disk rotor becomes a braking force acting between the wheel and the road surface.

As described above, the braking force can be generated in each wheel in accordance with the brake pedal operation of the driver.

Although not illustrated in detail in FIG. 1, the brake control device 15 includes, for example, a CPU, a ROM, a RAM, and an input/output device, similar to the vehicle control device 1. Brake force commands from a combined sensor 14 capable of detecting a longitudinal acceleration, a lateral acceleration, and a yaw rate, wheel speed sensors 11FL, 11FR, 11RL, and 11RR installed on the respective wheels, and the brake control device 15 described above and a sensor signal from a steering wheel angle detection device 21 via the steering control device 8 described later are input to the brake control device 15.

In addition, the output of the brake control device 15 is connected to the brake control mechanism 13 including a pump (not illustrated) and a control valve, and can generate any braking force on each wheel independently of the brake pedal operation of the driver. The brake control device 15 has a role of estimating the spin, the drift-out, and the lock of the wheel of the vehicle based on the above information, generating the braking force of the corresponding wheel to suppress the wheel, and enhancing the steering stability of the driver.

In addition, the vehicle control device 1 has a role capable of generating any braking force in the vehicle 500 by transmitting a brake command to the brake control device 15 in communication and automatically performing braking in automatic driving in which no operation by the driver occurs. However, the present invention is not limited to the brake control device 15, and other actuators such as brake-by-wire may be used.

Next, the steering operation will be described. In a state where the driver drives the vehicle 500, a steering torque detection device 7 and a steering wheel angle detection device 21 detect the steering torque and the steering wheel angle input by the driver via a steering wheel 6, respectively, and the steering control device 8 controls a motor (not illustrated) based on the pieces of information to generate assist torque.

Although not illustrated in detail in FIG. 1, the steering control device 8 includes, for example, a CPU, a ROM, a RAM, and an input/output device, similar to the vehicle control device 1.

The steering control mechanism 10 is moved by the resultant force of the steering torque of the driver and the assist torque by the motor, and the front wheels FL and FR are turned off. On the other hand, the reaction force from the road surface is transmitted to the steering control mechanism 10 in accordance with the turning angles of the front wheels FL and FR, and is transmitted to the driver as the road surface reaction force.

The steering control device 8 can generate torque by the motor and control the steering control mechanism 10 independently of the steering operation of the driver. Thus, the vehicle control device 1 has a role capable of controlling the front wheels FL and FR to any turning angles by transmitting a steering force command to the steering control device 8 in communication, and automatically performing steering in automatic driving in which no operation by the driver occurs. However, the present invention is not limited to the steering control device 8, and other actuators such as steer-by-wire may be used.

Next, an accelerator will be described. The stepping amount of an accelerator pedal 17 by the driver is detected by a stroke sensor 18 and input to the acceleration control device 19. Although not illustrated in detail in FIG. 1, the acceleration control device 19 includes, for example, a CPU, a ROM, a RAM, and an input/output device, similar to the vehicle control device 1.

The acceleration control device 19 adjusts a throttle opening in accordance with the accelerator pedal stepping amount to control the engine.

As described above, the vehicle can be accelerated in accordance with the accelerator pedal operation of the driver.

Further, the acceleration control device 19 can control the throttle opening independently of an accelerator operation by the driver. Therefore, the vehicle control device 1 has a role capable of generating any acceleration in the vehicle 500 by transmitting an acceleration command to the acceleration control device 19 in communication and automatically performing acceleration in automatic driving in which no operation by the driver occurs.

Figure 2:
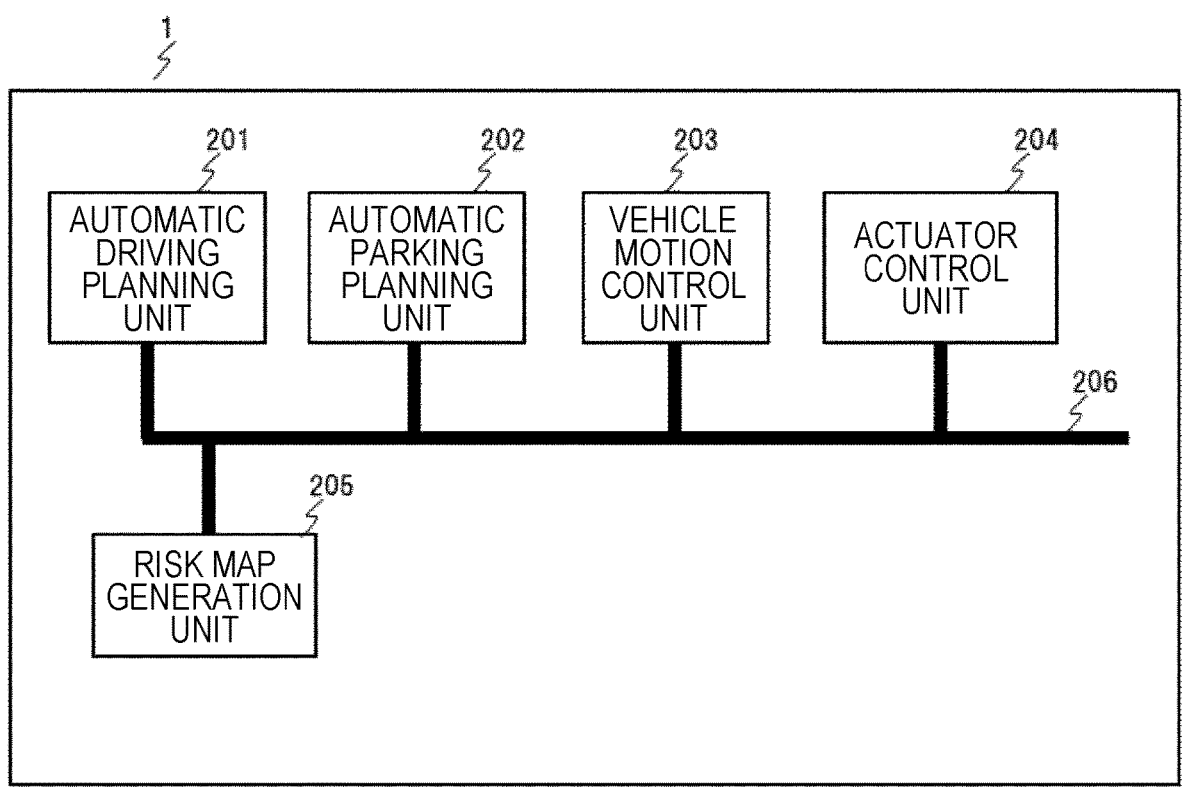
FIG. 2 is a block diagram of an automatic driving control device mounted on the vehicle control device.

Next, the configuration of an automatic driving control device mounted on the vehicle control device 1 in Embodiment 1 will be described with reference to the block diagram illustrated in FIG. 2.

The vehicle control device 1 includes an automatic driving planning unit 201, an automatic parking planning unit 202, a vehicle motion control unit 203, an actuator control unit 204, and a risk map generation unit 205, which are mounted on different controllers. The automatic driving planning unit 201 automatically plans an operation of the host vehicle for automatically driving the host vehicle to a destination, which will be described later. The automatic parking planning unit 202 plans an operation of the host vehicle for automatically parking the host vehicle in a parking frame in a parking lot or the like. The vehicle motion control unit 203 generates a command value for controlling a vehicle motion of an automatic driving vehicle. The actuator control unit 204 controls each actuator of the engine, the brake, the steering, and the like.

Therefore, a vehicle network 206 for performing communication between the controllers is required. However, a case where the vehicle network 206 is wirelessly connected in addition to wired connection is also considered. Furthermore, as a mounting method to each controller, for example, a case where the automatic parking calculation unit 202 and the automatic driving planning unit 201 are mounted on the same hardware is also considered. In addition, a case where the actuator control unit 204 is mounted on different piece of hardware such as an engine control controller and a brake control controller is also considered. The vehicle motion control unit 203 controls the operation of the host vehicle 81 in accordance with the determination of whether or not the lane change is possible by the automatic driving planning unit 201.

Next, the configuration of the risk map generation unit 205 included in the vehicle control device 1 in Embodiment 1 will be described with reference to the block diagram illustrated in FIG. 3.

Figure 3:
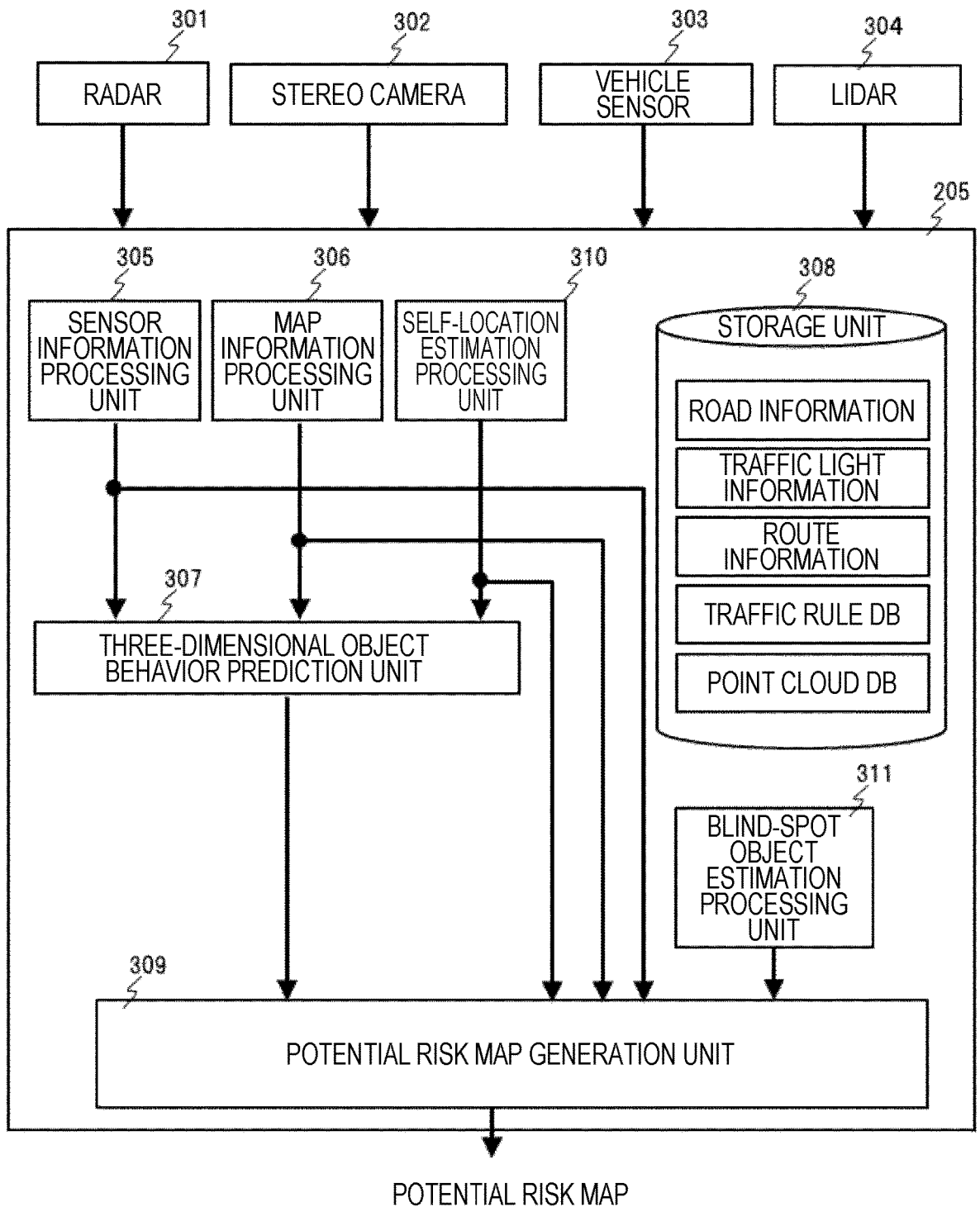
FIG. 3 is a block diagram of a risk map generation unit in the vehicle control device.

In FIG. 3, information on the surrounding environment, which is obtained based on information of a radar 301, a stereo camera 302, a vehicle sensor 303, and a lidar 304 is input to a sensor information processing unit 305, and is converted into object information on a moving object existing around the host vehicle.

The radar 301, the stereo camera 302, the vehicle sensor 303, and the lidar 304 are sensors that recognize the external environment. The radar 301 emits a radio wave toward a target object and measures a reflected wave thereof to measure a distance and a direction to the object. The stereo camera 302 simultaneously photographs images of the target object from a plurality of different directions to also acquire information of the object in a depth direction. The vehicle sensor 303 is a sensor as a sensor that measures the speed of the vehicle or the number of revolutions of tires, or a sensor group that can detect a vehicle state, for example, information obtained by calculating the average position of the automatic driving vehicle using a GNSS (global navigation satellite system), destination information input by a person who is an occupant of the automatic driving vehicle using a navigation system as an interface, and destination information designated by an operator or the like in a remote location utilizing wireless communication such as a telephone line. The lidar 304 measures scattered light with respect to irradiation with laser emitted in pulsed shape, and detects a distance to a target at a long distance.

As specific object information, attribute information of pedestrians, bicycles, vehicles, and the like, and the current positions and current speed vectors thereof are extracted.

Here, the moving object includes a parked vehicle that may move in the future even if the speed obtained at the current time is zero. In addition, there is provided a storage unit 308 that stores road information and traffic light information from a point from which the host vehicle starts automatic driving to a target point and the surroundings of the target point, route information from the current position to the target point, a traffic rule database of a section where the host vehicle travels, and the like.

In addition, there is provided a point cloud database used by a self-location processing unit 310. In addition, there is provided a map information processing unit 306 for arranging lighting information and the like of a traffic light through which the automatic driving vehicle is scheduled to pass based on lane center line information and traffic light information of a road necessary for performing automatic driving based on information stored in the storage unit 308 and making the resultant of the arrangement into a usable format. Furthermore, the self-location processing unit 310 described later estimates a location where the host vehicle exists, based on the peripheral information obtained by the sensor, the point cloud database, the steering angle of the vehicle, the vehicle speed, and information obtained by the GNSS.

Then, the object information and the map information are input to a three-dimensional object behavior prediction unit 307. The three-dimensional object behavior prediction unit 307 calculates future position and speed information (object prediction information) of each moving object based on the input information.

In order to predict the motion of each moving object, a position R(X(T), Y(T)) of each object at the future time T is predicted based on the object information. As a specific prediction method, when the current position of the moving object is set as Rn0(Xn(0), Yn(0)) and the current speed of the moving object is set as Vn(Vxn, Vyn), a method of performing prediction calculation based on the following linear prediction expression (1) is considered.

[Math. 1]

$$Rn(Xn(T), Yn(T)) = Vn(Vxn, Vyn) \times T + Rn0(Xn(0), Yn(0)) \quad (1)$$

The calculation method here assumes a uniform linear motion in which each object moves while maintaining the current speed in the future time. This makes it possible to predict many objects in a short time.

Then, the three-dimensional object behavior prediction result, the map information, and blind-spot object estimation information generated by a blind-spot object estimation processing unit 311 described later are input to a potential risk map generation unit 309. As will be described later, the potential risk map generation unit 309 calculates a potential risk map around the host vehicle based on route information and the current vehicle state (speed, position, direction, and the like) without causing the automatic driving vehicle colliding with another vehicle and a three-dimensional object existing around the host vehicle.

Next, the blind-spot object estimation processing unit 311 will be described. The blind-spot object estimation processing unit 311 calculates a blind-spot region around the host vehicle 81 and estimates an object existing in the calculated blind-spot region and a behavior trend of the object, based on the peripheral state of the host vehicle 81 detected by the peripheral state detection sensors such as the radar 301, the stereo camera 302, the vehicle sensor 303, and the lidar 304 and the feature amount extracted from the map information.

Figure 4:
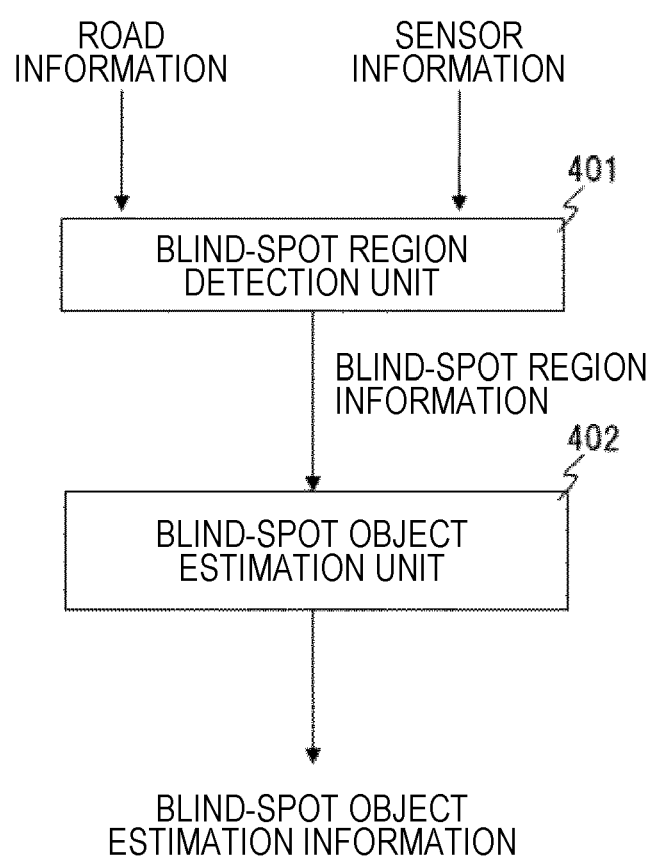
FIG. 4 is a block diagram of a blind-spot object estimation processing unit.

The blind-spot object estimation processing unit 311 will be described with reference to FIG. 4. Here, first, a blind-spot region is detected based on road information stored in the storage unit 308, map information obtained as a result of processing the road information, and information of each in-vehicle sensor.

Figure 19:
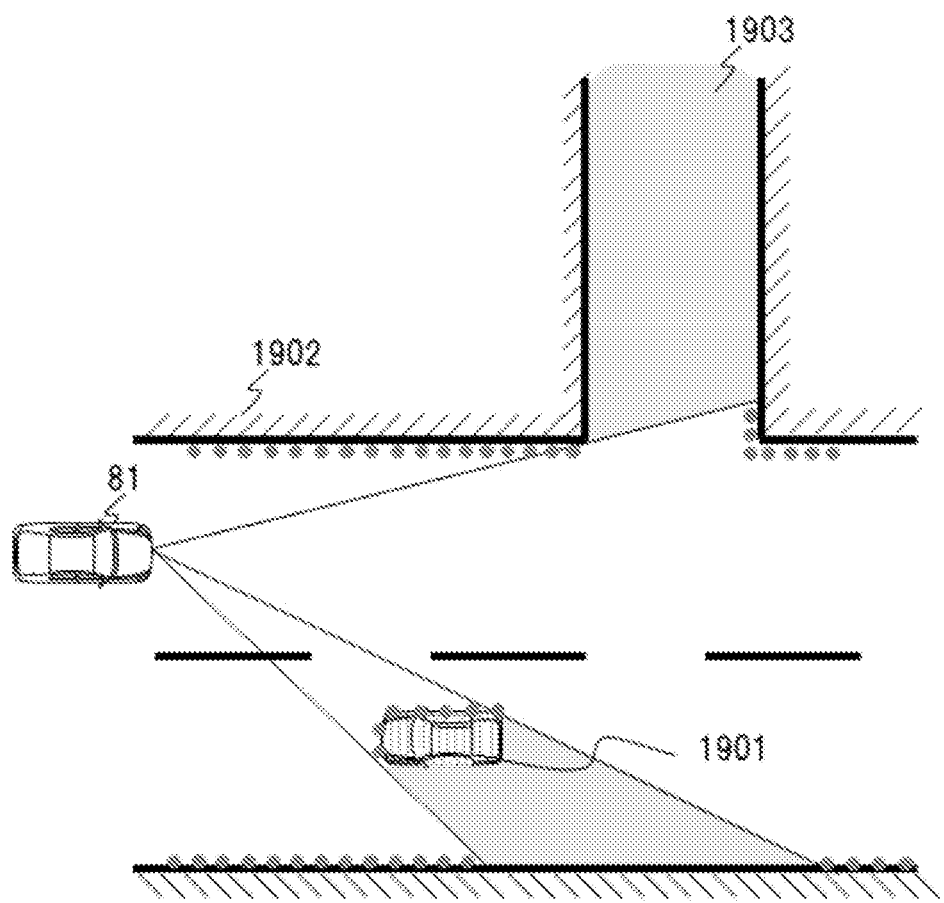
FIG. 19 is an explanatory diagram of a blind-spot region.

Here, as illustrated in FIG. 19, the blind-spot region is defined as a state in which it is not possible to detect the back of an object due to a surrounding vehicle 1901 existing around the host vehicle 81, a wall or a fence 1902 existing on a road, or the like. When there is a blind-spot region 1903 on a road through which the host vehicle 81 is about to pass, an object may jump out from the blind-spot region 1903, and it is considered that emergency stop is necessary to prevent a probability of collision with the host vehicle 81 and collision with the object. In such a case, ride comfort may deteriorate.

Therefore, a blind-spot region detection unit 401 detects the blind-spot region based on the road information, the map information obtained as a result of processing the road information, and the information of a detectable range of each in-vehicle sensor. Then, the blind-spot region detection unit 401 outputs the detected blind-spot region information to a blind-spot object estimation unit 402.

Then, the blind-spot object estimation unit 402 estimates the type, the model, the behavior trend of an object that may be hidden in the blind-spot region, or all of the type, the model, and the behavior trend, based on the blind-spot region information. As an estimation method, the type of an object hidden in the blind-spot region is estimated based on the road state as follows.

There are whether or not there is a fence between a road and a sidewalk, a nearby park and time information (time of whether or not a child is playing), whether or not there is a school zone, a color of a signal (blinking red and yellow), a road sign, an accident frequent spot based on past statistical information, whether a parked vehicle is a normal vehicle or an ambulance, whether a school bus is stopped, whether an oncoming lane goes out from a space between opposing vehicles when there is a traffic jam, a drive through or an entrance of a store, the vicinity of the entrance of a parking lot of a supermarket, and the like. Alternatively, a method of statistically predicting the type of a blind-spot object based on information learned in advance by inputting point cloud information obtained by the in-vehicle sensor and image information obtained from a camera to a statistical model such as a neural network is considered.

The potential risk map generation unit 309 generates a region having a potential risk that the host vehicle 81 approaches the object based on the behavior trend of the object estimated by the blind-spot object estimation processing unit 311.

Figure 20:
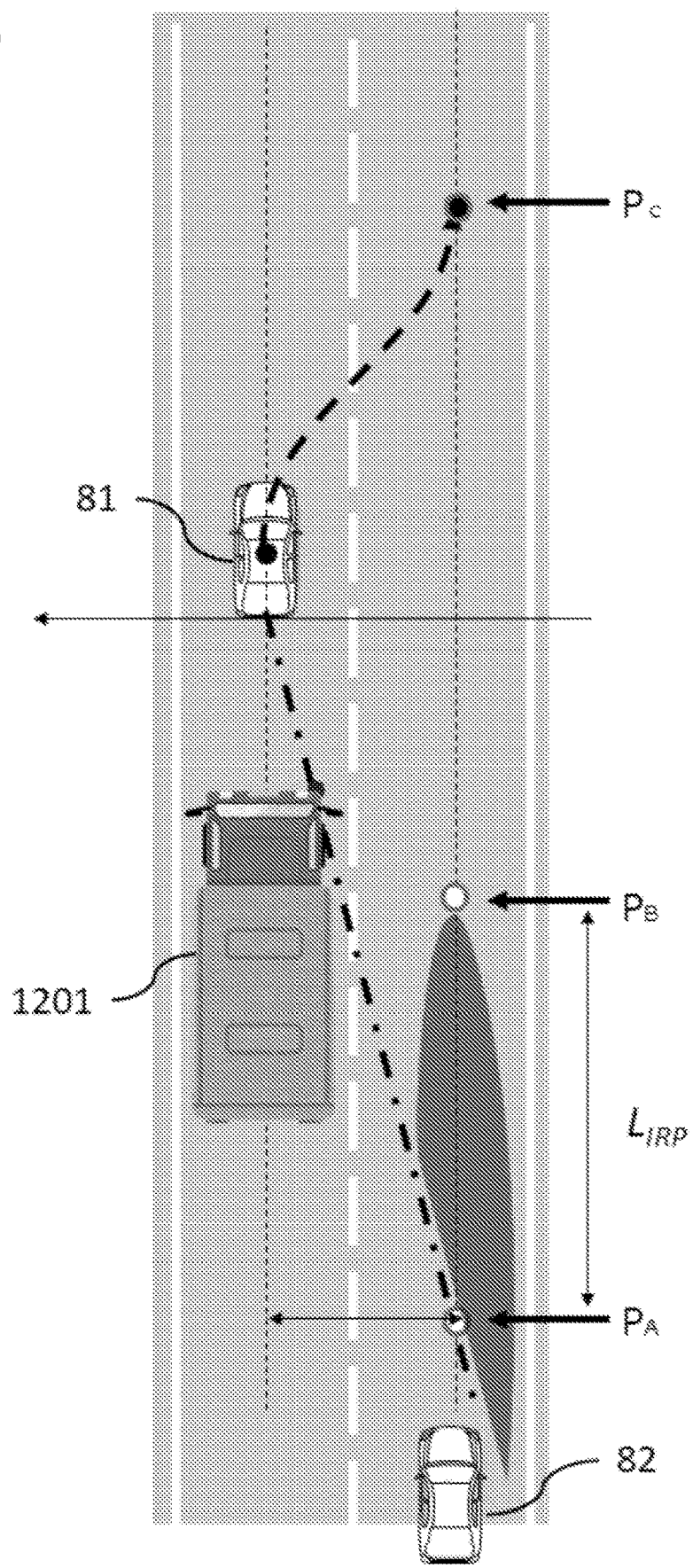
FIG. 20 is an operation explanatory diagram of a potential risk map generation unit.

Next, the operation of the potential risk map generation unit 309 will be described with reference to FIG. 20. The potential risk calculation method includes four steps as follows.

Step 1: The time taken for the host vehicle 81 to reach a lane change position Pc is obtained.

The time (T_self [sec]) taken for the host vehicle 81 to reach the lane change position Pc at which the lane change is completed is calculated based on the following expression (2). The lane change position Pc at which the lane change is completed is an intersection of a smoothly connecting curve with the center line of the lane change destination lane. Here, V_old(t) in the expression (2) is the speed profile planned at the previous sampling time, and M is the distance to the position at which the lane change is completed.

[Math. 2]

$$T\_self = \int_0^M \frac{dx}{V\_old(t)} \quad (2)$$

Step 2: The potential risk length $L_{IRP}$ is determined.

The length $L_{IRP}$ of the potential risk is defined as (the predicted speed u [m/s] of the object jumping out)×(the time [s] taken for the host vehicle 81 to reach the position at which the lane change is completed), and is calculated by the following expression (3).

[Math. 3]

$$\text{Length } L_{IRP} \text{ of potential risk} = T\_self \times u [m] \quad (3)$$

Step 3: The jumping-out coordinate position PA is obtained.

The jumping-out coordinate position PA is set as an intersection between an extension line of a region boundary (one-dot chain line in FIG. 20) dividing a blind spot where sensor detection cannot be performed by the following vehicle 82 and a lane change destination lane (an extension line (illustrated by the broken line) of a lane where the lane change position PA is located).

Step 4: A potential risk map is generated.

A point PB is calculated based on the jumping-out coordinate position PA and the length $L_{IRP}$ of the potential risk map obtained in Step 3, and a region from the jumping-out coordinate position PA to the point PB is set as the potential risk map. The shape of the potential risk map may be a quadrangle in which the length is set to $L_{IRP}$ and the width is set to a lane width, or can be set to be a partial shape of an ellipse in which the closer to the point PB from the coordinate position PA, the narrower the width.

The automatic driving planning unit 201 generates a lane-change trajectory of the host vehicle 81 from the peripheral state of the host vehicle 81 and the map information, compares the generated lane-change trajectory with the potential risk map, and determines whether or not the lane change of the host vehicle 81 is possible.

Figure 5:
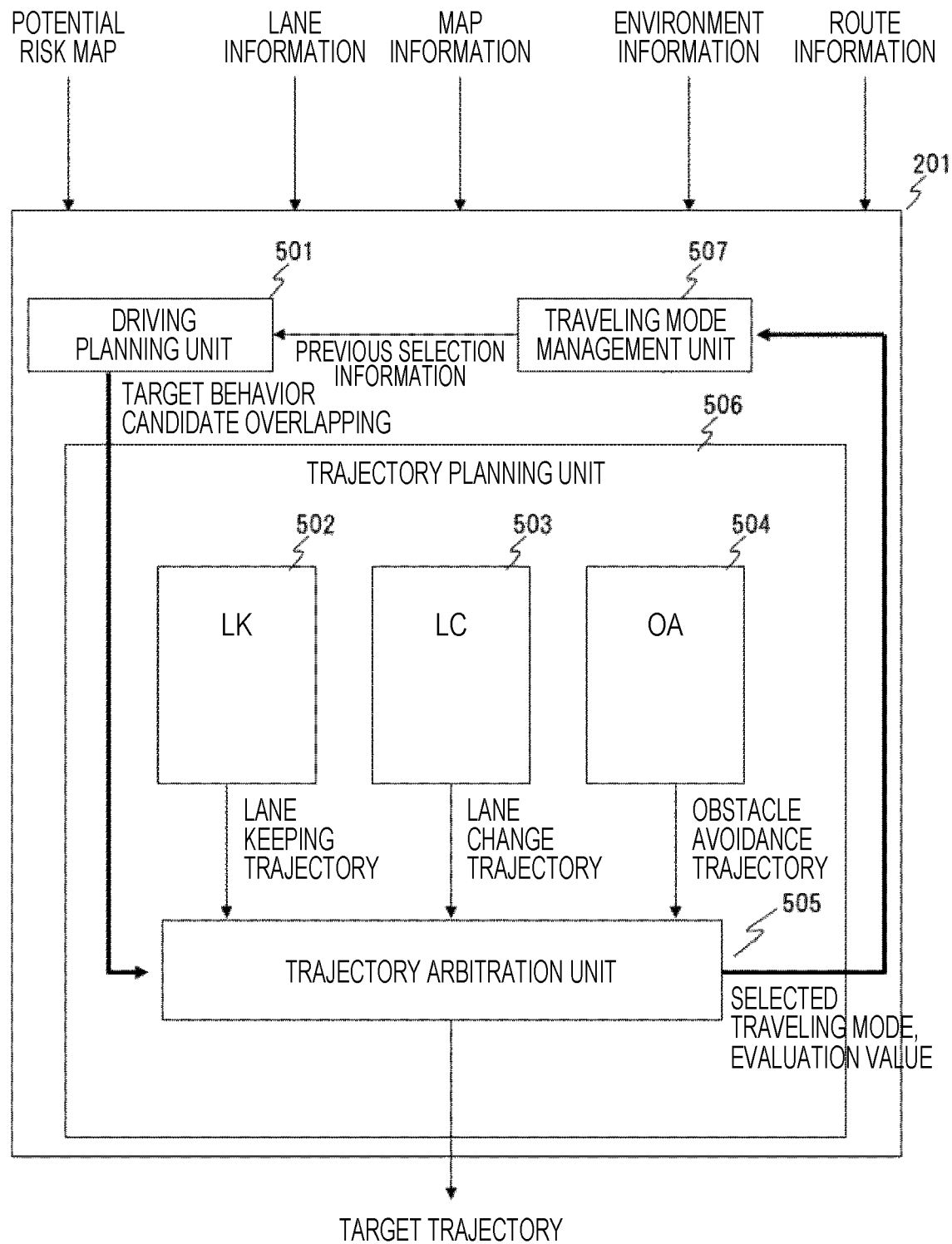
FIG. 5 is a block diagram of an automatic driving planning unit.

Next, the automatic driving planning unit 201 will be described with reference to FIG. 5.

The automatic driving planning unit 201 calculates a target trajectory based on the potential risk map, the environment information, the lane information, and the map information. The automatic driving planning unit 201 includes a driving planning unit 501 and a trajectory planning unit 506. Each block will be described below.

The driving planning unit 501 calculates a target behavior candidate weight that may be taken by the host vehicle 81, based on the route information, the environment information, and the like. The target behavior candidate weight is a weight for a behavior that may be taken by the host vehicle 81, such as keeping the current lane (LK), changing the current lane to an adjacent lane (LC), or avoiding an obstacle existing ahead (OA).

For example, LK=100, LC=0, OA=0, and the like are satisfied in a situation where there is no vehicle or object to be avoided ahead while traveling on a straight road, and it is considered that there is no need to change the lane to the adjacent lane from the route information.

The trajectory planning unit 506 includes a lane keeping trajectory generation unit 502, a lane-change trajectory generation unit 503, an obstacle avoidance trajectory generation unit 504, and a trajectory arbitration unit 505. The lane keeping trajectory generation unit 502 generates a trajectory for keeping the center of the lane on which the host vehicle 81 is currently traveling. The lane-change trajectory generation unit 503 generates a trajectory for performing lane change to an adjacent lane of the lane on which the host vehicle 81 is currently traveling. The obstacle avoidance trajectory generation unit 504 generates a trajectory that avoids an object that is an obstacle for traveling existing in the lane on which the host vehicle 81 is currently traveling. For the lane keeping trajectory, the lane-change trajectory, and the obstacle avoidance trajectory, the trajectory arbitration unit 505 evaluates each trajectory based on the degree of safety with a surrounding object and the target behavior candidate weight, and selects a trajectory with the best evaluation.

Based on a traveling mode selected by the trajectory arbitration unit 505 and a trajectory evaluation value based on each behavior candidate, a traveling mode management unit 507 calculates previous selection information for calculating the target behavior candidate weight in the next sampling time. For example, when LK is selected by the evaluation values of LK=60, LC=40, and OA=0, the previous selection information is generated such that the possibility that LK is selected for the continuity of the behavior is high even in the next sampling time.

Figure 6:
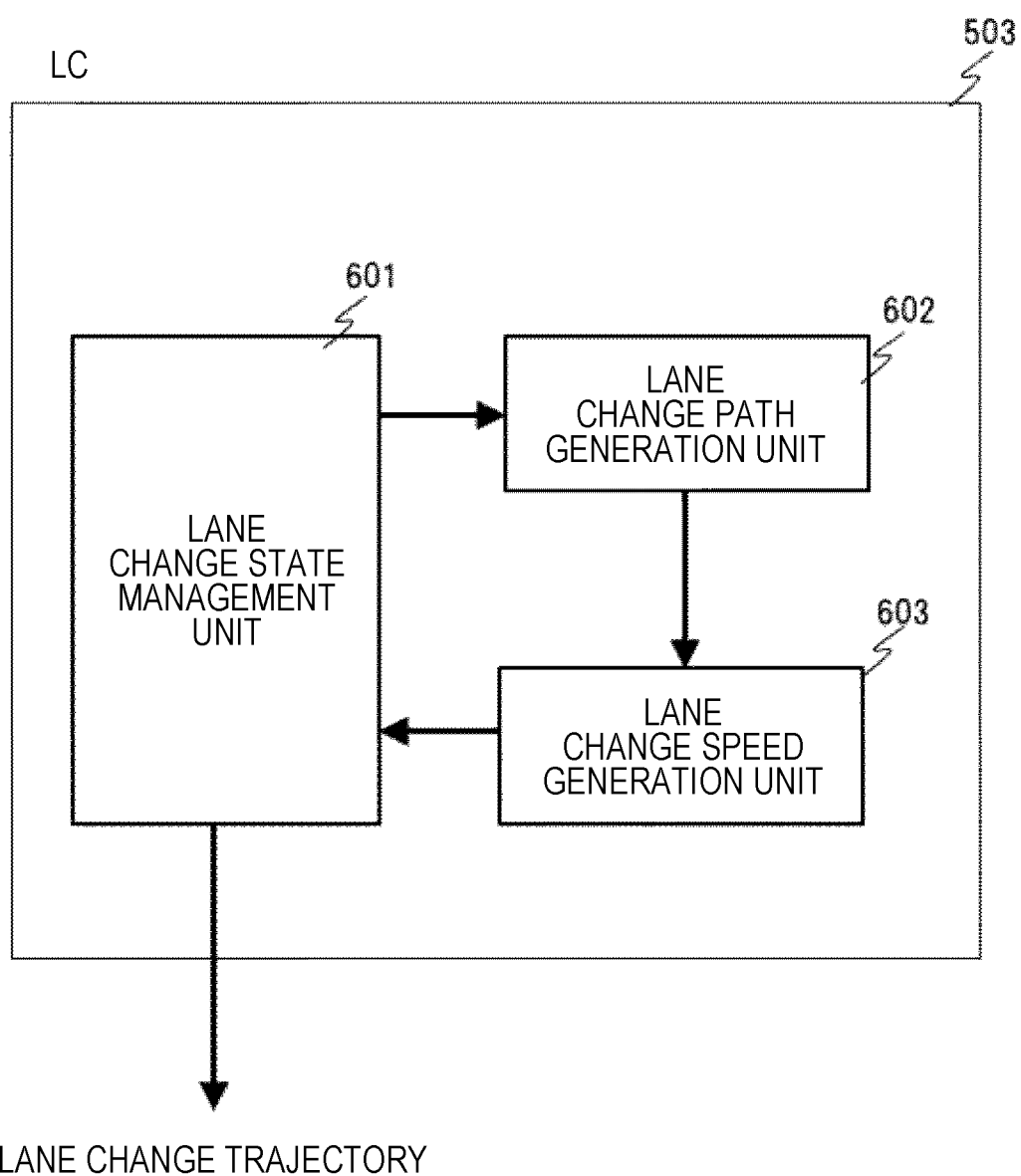
FIG. 6 is a block diagram of a lane-change trajectory generation unit.

Next, the lane-change trajectory generation unit 503 in Embodiment 1 will be described with reference to FIG. 6. It is conceivable that the lane-change trajectory generation unit 503 includes a lane change state management unit 601, a lane change path generation unit 602, and a lane change speed generation unit 603. Details of the lane change state management unit 601 will be described later.

The lane change path generation unit 602 generates a target path for lane change based on the lane change state. As a method of generating the target path, a method of generating a spline curve with respect to a target position can be considered. The lane change speed generation unit 603 calculates a speed profile for the target path generated by the lane change path generation unit 602, when the vehicle travels on the target path. For example, time-series points of 50 points in speed are calculated at intervals of 0.1 seconds when the vehicle travels on the path for 5 seconds. For example, as a method of calculating the speed profile, it is conceivable to generate speed sequence information satisfying the following equation (4) as a candidate of the speed profile.

[Math. 4]

$$\text{Min.} \int_{t_1}^{t_2} [w4(\text{longitudinal acceleration of host vehicle})^2 + w5(\text{lateral acceleration of host vehicle})^2 + w6(\text{limited speed} - \text{host vehicle speed})2]dt \quad (4)$$

In the equation (4), w4 to w6 are weighting factors.

Figure 7:
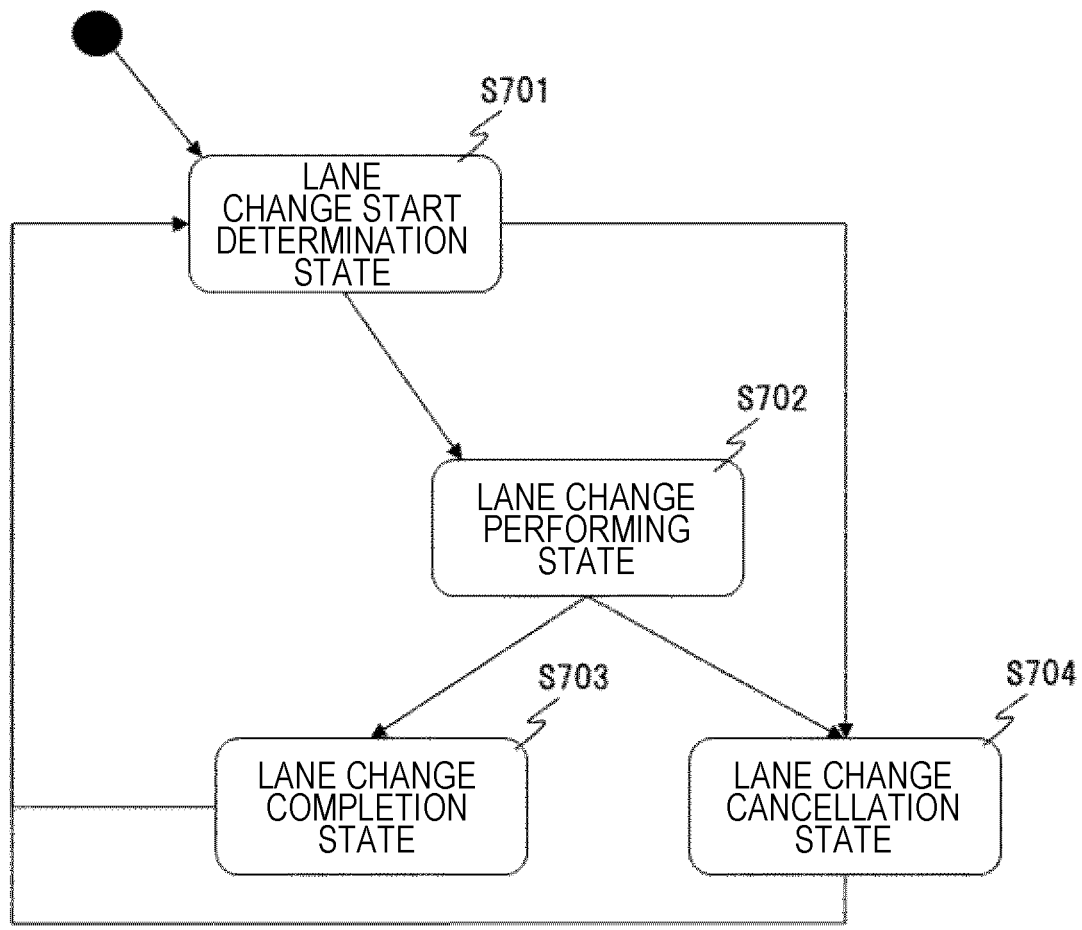
FIG. 7 is a state transition diagram of a lane change state management unit.

Next, the state transition of the lane change state management unit 601 will be described with reference to FIG. 7. In FIG. 7, the lane change state management unit 601 is a unit that manages a state when the lane is changed to an adjacent lane. The state includes a lane change start determination state S701, a lane change performing state S702, a lane change completion state S703, and a lane change cancellation state S704. When it is determined that the lane change is possible in the lane change start determination state S701, the state transitions to the lane change performing state S702. When it is determined that the lane change is not possible, the state transitions to the lane change cancellation state S704.

When the lane change has been completed in the lane change performing state S702, the state transitions to the lane change completion state S703. When it is determined that the environmental condition or the like has changed during the lane change and the lane change is not possible, the state transitions to the lane change cancellation state S704.

Each state will be described below.

Figure 8:
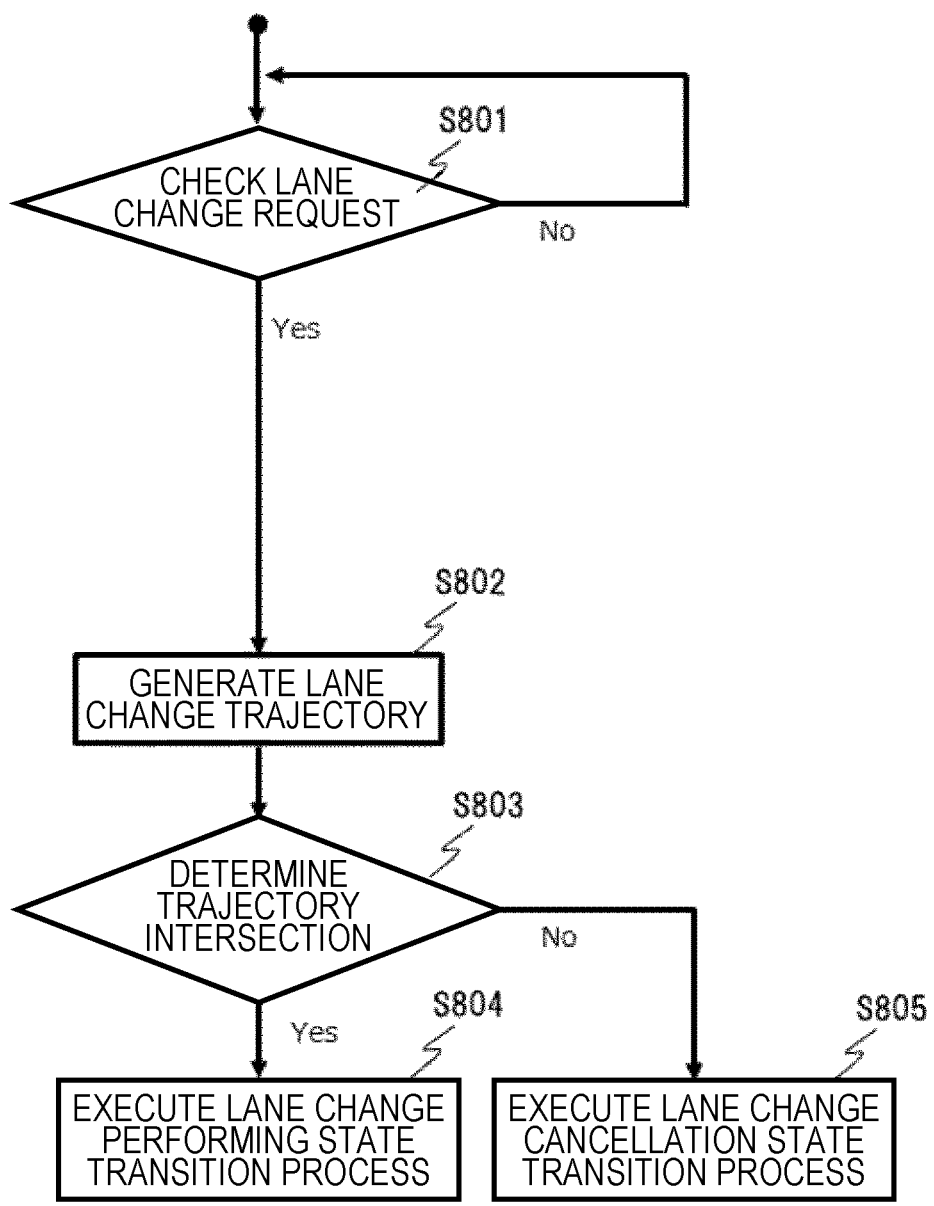
FIG. 8 is a flowchart of a process executed in a lane change start determination state.

A process executed in the lane change start determination state S701 will be described with reference to the flowchart illustrated in FIG. 8. When the state transitions to the lane change start determination state S701, lane change request check S801 is performed. Here, when the value of LC of the target behavior candidate weight generated by the driving planning unit 501 is equal to or greater than a predetermined value, the process transitions to lane-change trajectory generation S802. Here, a trajectory necessary for lane change is generated by using the lane change path generation unit 602 and the lane change speed generation unit 603.

Then, in trajectory intersection determination S803, an overlap determination between the potential risk map and the generated lane-change trajectory is performed. When it is determined that the trajectories do not overlap each other, the process proceeds to a lane change performing state transition process S804. When it is determined in the trajectory intersection determination S803 that there is an overlap, a lane change cancellation state transition process S805 is executed. That is, when the lane-change trajectory and the potential risk map intersect, the automatic driving planning unit 201 determines that the lane change is not possible.

In each transition process, a process for transitioning the state is executed based on the state transition diagram illustrated in FIG. 7.

Figure 9:
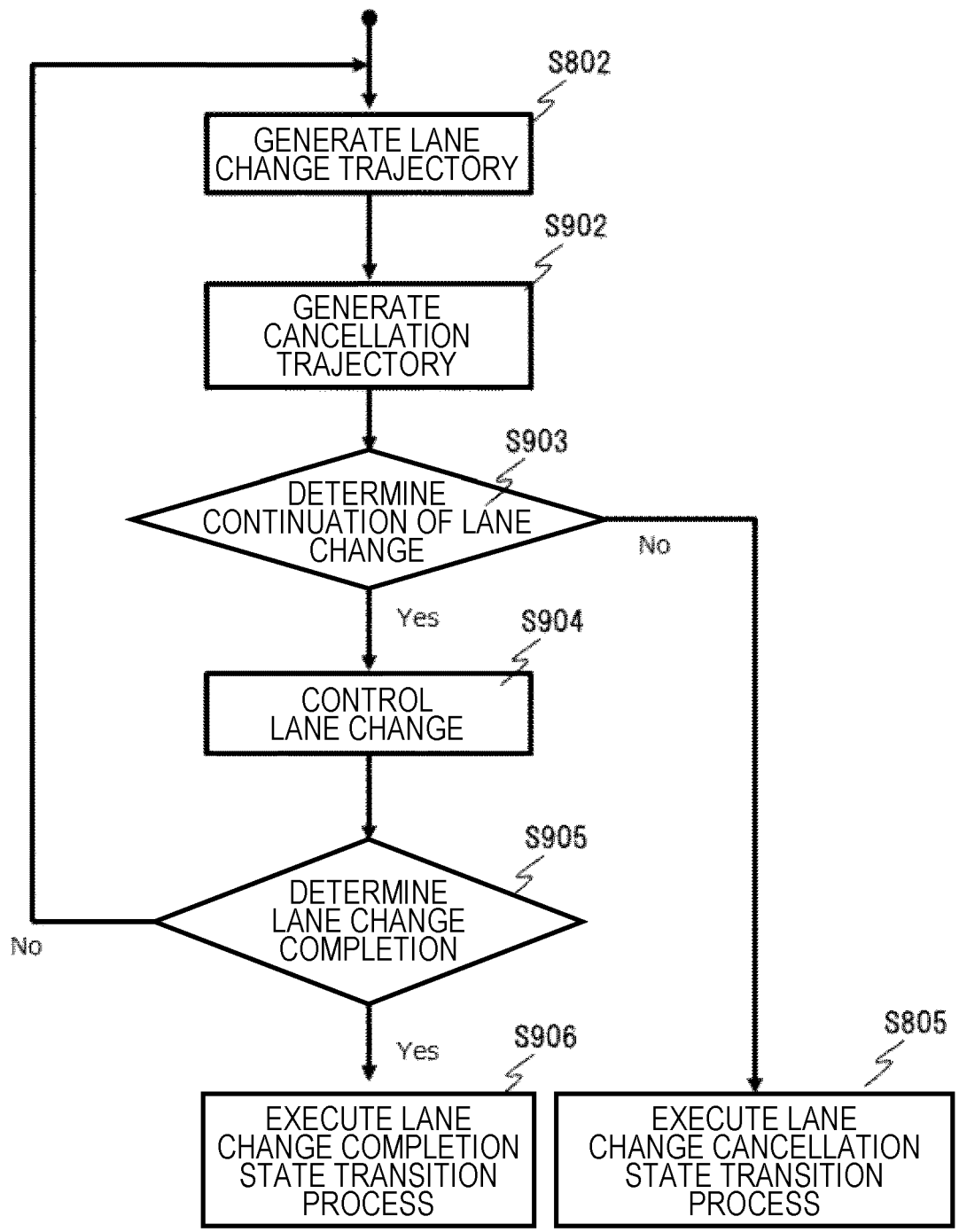
FIG. 9 is a flowchart of a process executed in a lane change performing state.

A process executed in the lane change performing state S702 will be described with reference to the flowchart illustrated in FIG. 9. When the state transitions to the lane change performing state S702, the lane-change trajectory generation S802 is performed. Then, cancellation trajectory generation S902 is performed. Here, the lane change path generation unit 602 and the lane change speed generation unit 603 are used to generate a lane-change trajectory for canceling the lane change from the current position and returning to the original lane.

Then, lane change continuation determination S903 is performed. In the lane change continuation determination S903, the generated lane-change trajectory and cancellation trajectory are compared with each other, and evaluation is performed based on indices of safety and ride comfort. For example, when the host vehicle is caused to travel based on the lane-change trajectory and it is expected that the host vehicle may suddenly approach other vehicles or surrounding objects, it is determined that the lane change cannot be continued, and the lane change cancellation state transition process S805 is executed. When it is determined that the lane change can be continued, lane change control S904 is performed. In the lane change control S904, the generated lane-change trajectory is transmitted to the trajectory arbitration unit 505. When the trajectory is selected by the trajectory arbitration unit 505, each actuator command value is created so as to follow the trajectory, and the host vehicle 81 is caused to change the lane.

In lane change completion determination S905, it is determined whether the lane change to the adjacent lane has been completed for the position of the host vehicle 81 based on the self-position information, the lane information, and the like. When it is determined in the lane change completion determination S905 that the lane change to the adjacent lane has been completed, the process proceeds to a lane change completion state transition process S906. When it is determined in the lane change completion determination S905 that the lane change has not been completed, the lane-change trajectory generation S802 is performed again. In the lane change completion state transition process S906, a process for transitioning the lane change completion state is performed based on the state transition diagram illustrated in FIG. 7.

Figure 10:
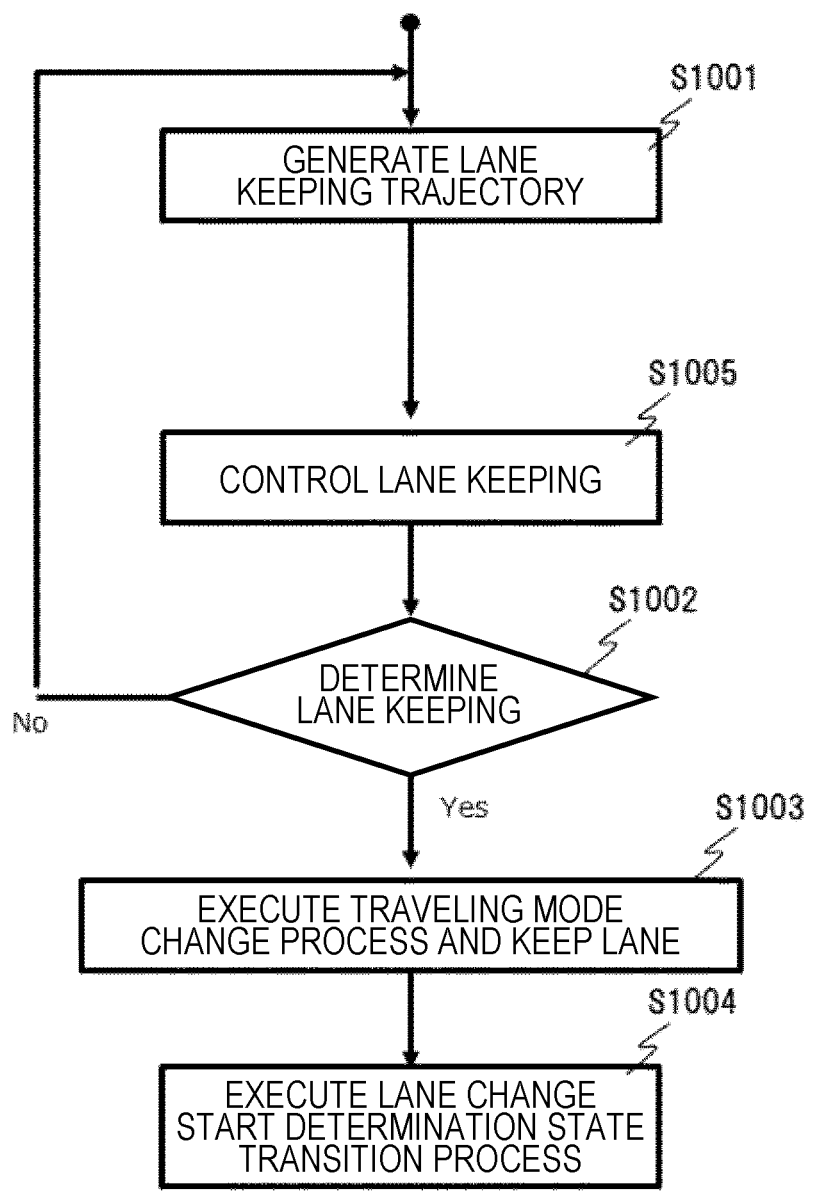
FIG. 10 is a flowchart of a process executed in a lane change completion state.

A process executed in the lane change completion state S703 will be described with reference to the flowchart illustrated in FIG. 10. When the state transitions to the lane change completion state S703, lane keeping trajectory generation S1001 is performed. Here, a trajectory for maintaining the host vehicle position within the current lane is generated by using the lane change path generation unit 602 and the lane change speed generation unit 603.

Then, lane keeping control S1005 is performed. In the lane keeping control S1005, the generated lane keeping trajectory is transmitted to the trajectory arbitration unit 505. When the trajectory is selected by the trajectory arbitration unit 505, each actuator command value is created so as to follow the trajectory, and the host vehicle 81 is caused to keep the lane.

Then, lane keeping determination S1002 is performed. Here, it is determined whether the current lane can be kept. It is determined whether the lane can be kept for a predetermined time. When it is determined that the lane cannot be kept, the process returns to the lane keeping trajectory generation S1001. When it is determined in the lane keeping determination S1002 that the lane can be kept, the traveling mode is changed to the lane keeping by a traveling mode change process S1003. Then, a lane change start determination state transition process S1004 is executed. In the lane change start determination state transition process S1004, a process for transitioning to the lane change start determination state is executed based on the state transition diagram illustrated in FIG. 7.

Figure 11:
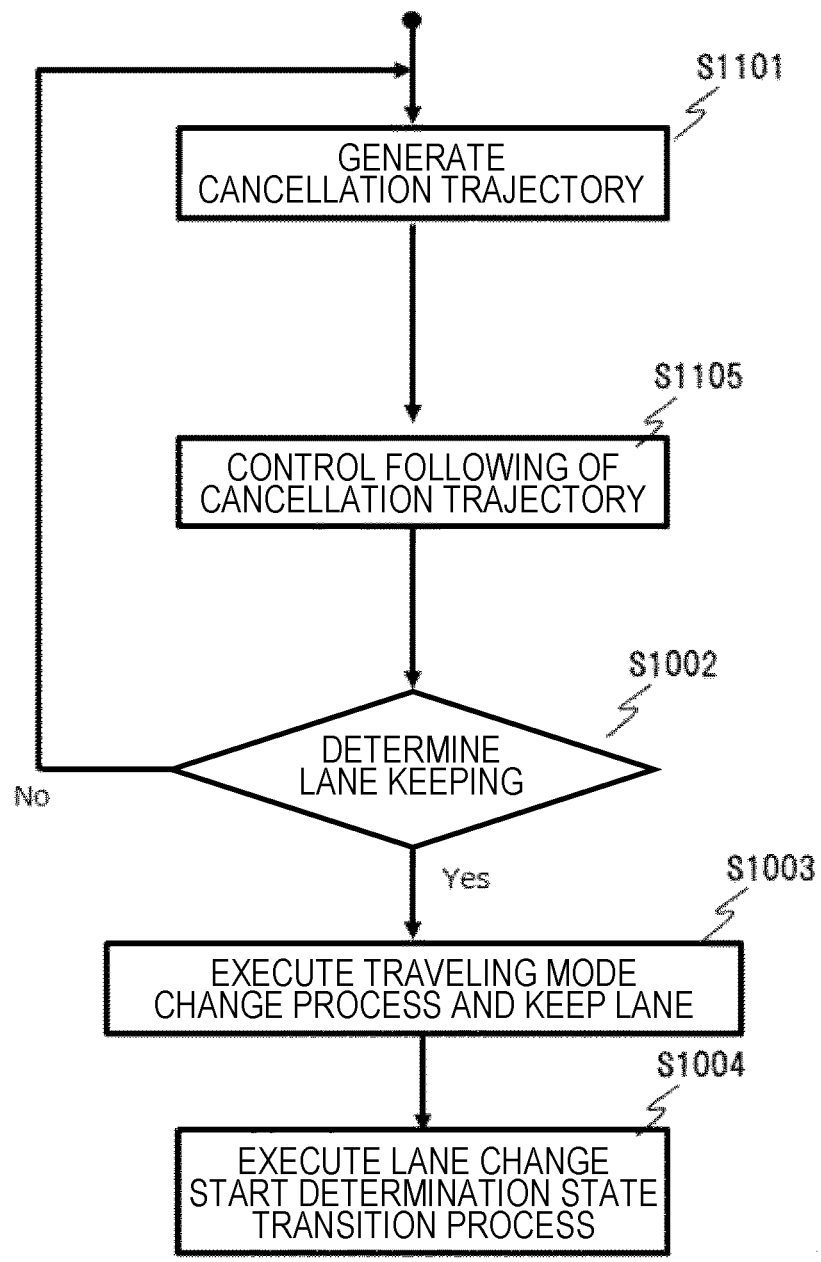
FIG. 11 is a flowchart of a process executed in a lane change cancellation state.

A process executed in the lane change cancellation state S704 will be described with reference to the flowchart illustrated in FIG. 11. When the state transitions to the lane change cancellation state S704, cancellation trajectory generation S1101 is performed. Here, a trajectory for returning the host vehicle position to the original lane is generated by using the lane change path generation unit 602 and the lane change speed generation unit 603.

Then, cancellation trajectory following control S1105 is performed. In the cancellation trajectory following control S1105, the generated cancellation trajectory is transmitted to the trajectory arbitration unit 505. When the trajectory is selected by the trajectory arbitration unit 505, each actuator command value is created so as to follow the trajectory, and the host vehicle 81 is returned to the original lane.

Then, lane keeping determination S1002 is performed. Here, it is determined whether the current lane can be kept. It is determined whether the lane can be kept for a predetermined time. When it is determined that the lane cannot be kept, the process returns to cancellation trajectory generation S1101. When it is determined in the lane keeping determination S1002 that the lane can be kept, the traveling mode is changed to the lane keeping by a traveling mode change process S1003. Then, the lane change start determination state transition process S1004 is executed. In the lane change start determination state transition process S1004, the process for transitioning to the lane change start determination state is executed based on the state transition diagram illustrated in FIG. 7.

Figure 12:
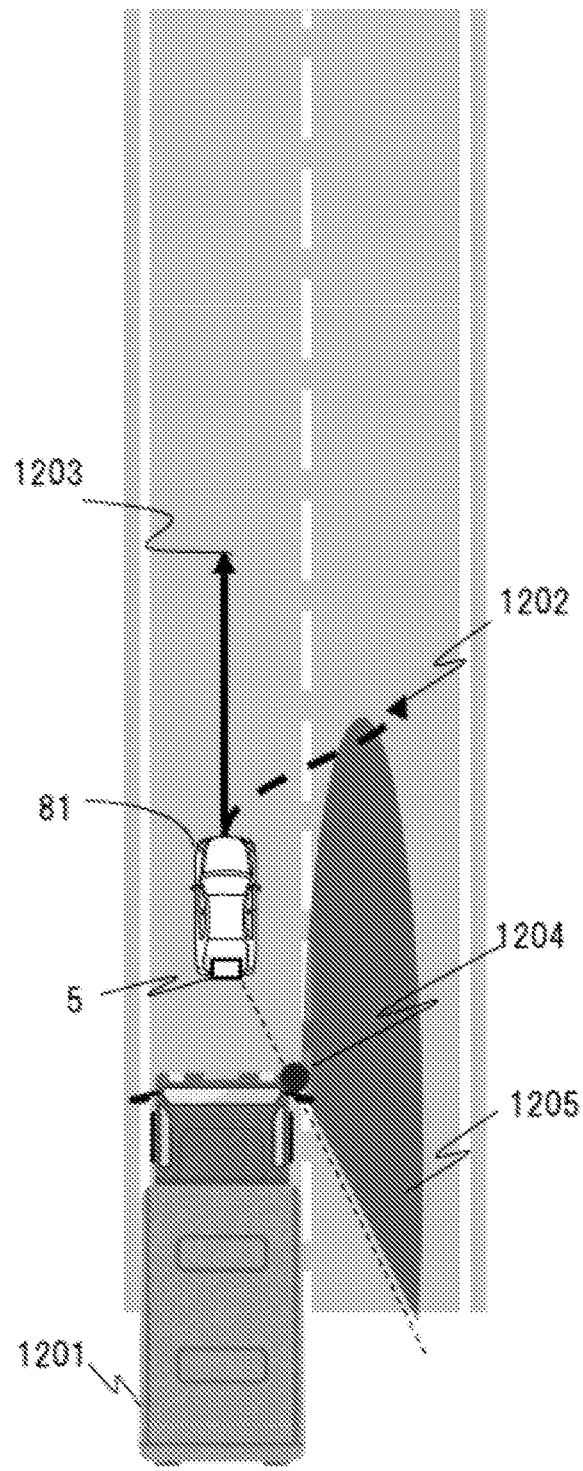
FIG. 12 is an explanatory diagram of an operation of changing a lane based on a prediction result of an object.

Next, an operation of changing the lane based on a prediction result of an object that may exist in a blind spot in Embodiment 1 will be described with reference to a schematic diagram of a representative scene illustrated in FIG. 12. In the scene illustrated in FIG. 12, the host vehicle 81 performs automatic driving travel, and a large-sized vehicle 1201 exists in the rear of the host vehicle 81. When the millimeter wave radar 5, which is a rear sensor, attempts to detect the rear of the host vehicle 81, a sensor blind spot is located on the left side in the traveling direction from a blind spot branch point 1204 due to the influence of the large-sized vehicle 1201.

Here, the host vehicle 81 detects that there is a blind spot with respect to the lane change direction of the host vehicle 81, based on the map information and information of a sensor that recognizes the surroundings. Therefore, the host vehicle 81 generates a potential risk map 1205 of an area where the object exists when the object jumps out from the blind spot. Then, a lane-change trajectory 1202 that does not impair the ride comfort is generated. Thus, the lane-change trajectory 1202 is compared with the potential risk map 1205, and it is determined that the lane change cannot be performed when a predetermined overlapping condition is satisfied. In this case, the host vehicle 81 is controlled to follow a lane keeping trajectory 1203 without performing the lane change.

In this manner, by generating the risk map based on the prediction of the vehicle or the like jumping out from the blind spot and comparing the risk map with the lane-change trajectory, even though the vehicle jumps out from the blind spot by any chance, the host vehicle does not jump out and approach a vehicle, and rapid acceleration/deceleration becomes unnecessary, so that it is possible to prevent deterioration of ride comfort.

As described above, according to Embodiment 1 of the present invention, it is possible to realize a vehicle control device capable of suppressing an unnecessary lane-change operation of a host vehicle 81 and suppressing deterioration of ride comfort.

Embodiment 2

Figure 13:
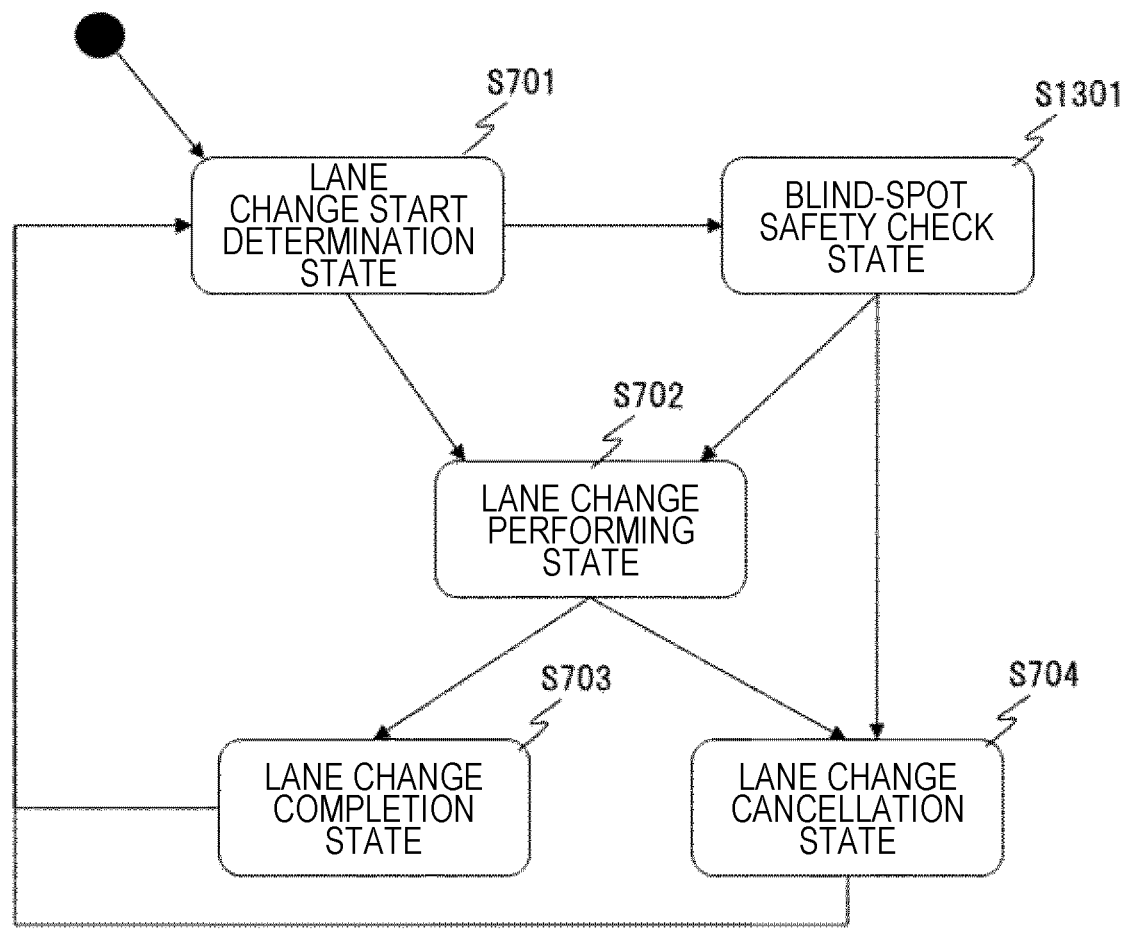
FIG. 13 is a state transition diagram of a lane-change trajectory generation unit in Embodiment 2.

Next, a vehicle control device according to Embodiment 2 of the present invention will be described with reference to FIG. 13. A vehicle control device 1 in Embodiment 2 of the present invention is different from that in Embodiment 1 illustrated in FIG. 7 that the vehicle control device 1 in Embodiment 2 includes a blind-spot safety check state S1301 as illustrated in a state transition of a lane-change trajectory generation unit 503 illustrated in FIG. 13. The configuration illustrated in FIGS. 2 to 6 in Embodiment 1 is similar in Embodiment 2, and thus illustration and detailed description thereof are omitted.

In Embodiment 2, when it is determined that the lane change is impossible, an automatic driving planning unit 201 calculates a blind-spot reduction trajectory 1603, and a vehicle motion control unit 203 performs control such that the host vehicle 81 travels on the blind-spot reduction trajectory 1603.

Figure 14:
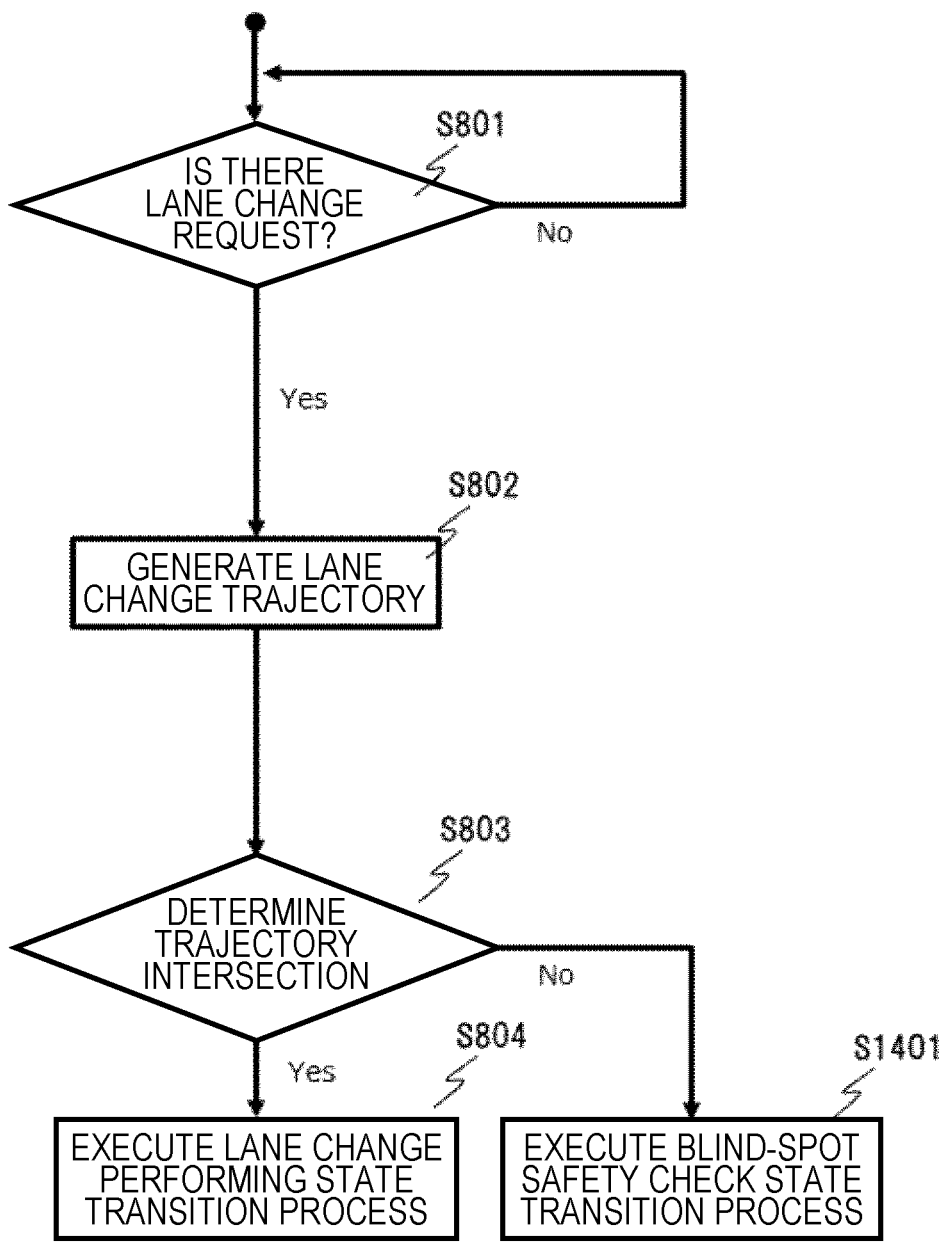
FIG. 14 is a flowchart of the lane change start determination state.

A state transition condition in a lane change start determination state S701 in FIG. 13 will be described with reference to the flowchart illustrated in FIG. 14. In Embodiment 1, when it is determined in the trajectory intersection determination S803 (FIG. 8) that intersection has occurred, the state transitions to the lane change cancellation state S704. However, in Embodiment 2, a process of transitioning to a blind-spot safety check state S1301 is executed.

Figure 15:
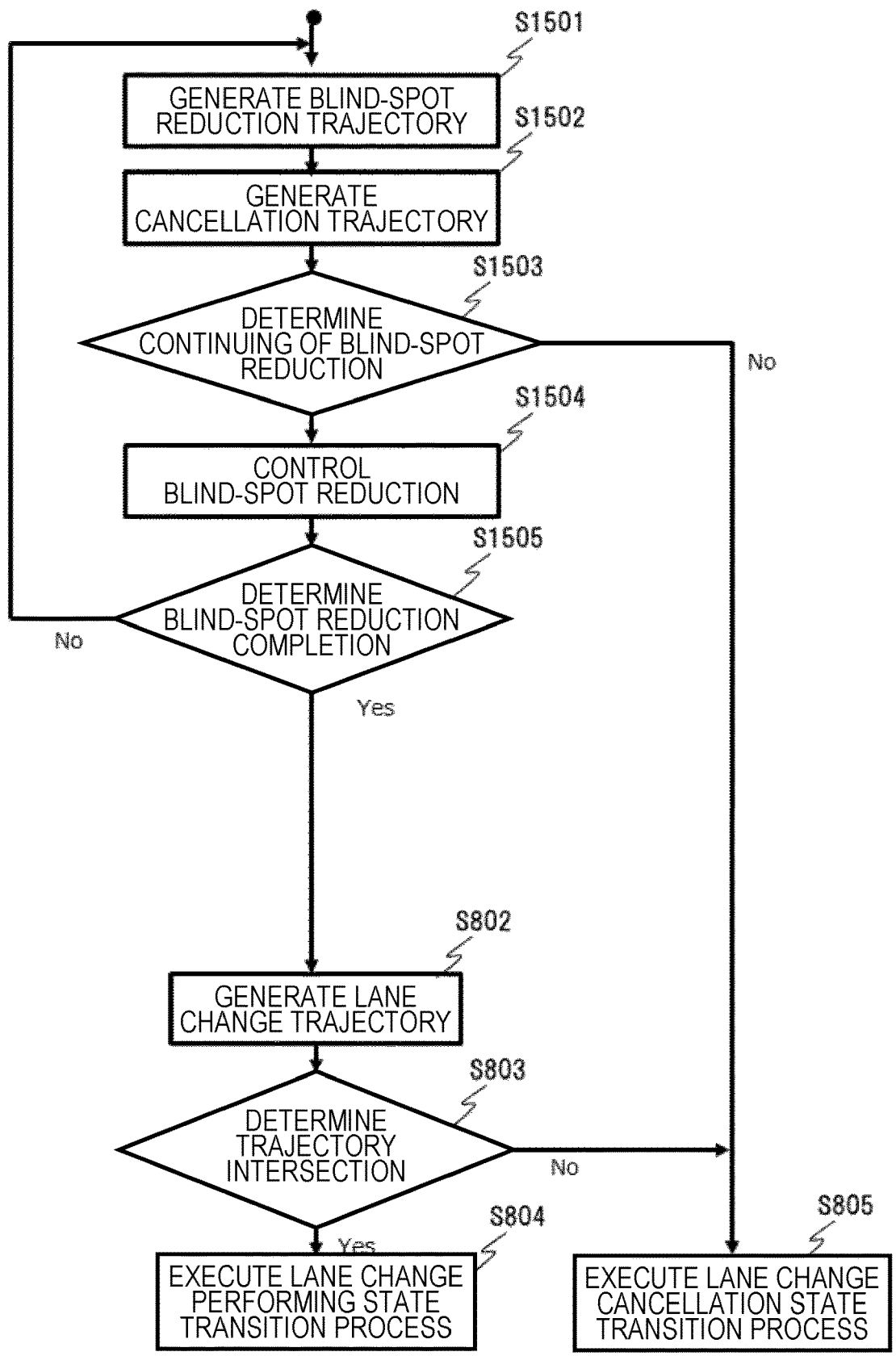
FIG. 15 is a flowchart of a blind-spot safety check state.

The blind-spot safety check state S1301 will be described with reference to a flowchart illustrated in FIG. 15. When the state transitions to the blind-spot safety check state S1301, blind-spot reduction trajectory generation S1501 is performed. Here, the trajectory is generated such that the host vehicle position approaches the boundary lane with the lane change destination within the current lane.

Then, cancellation trajectory generation S1502 is performed. This is a trajectory for returning from a position when the blind spot is reduced to a position with the original lane center position as a target.

Then, blind-spot reduction continuation determination S1503 is performed. Here, when a blind-spot reduction operation is continued, in a case where the vehicle is detected from the blind-spot region and approaches the host vehicle 81, or in a case where a new object is detected and safety of traveling of the host vehicle 81 cannot be secured, it is determined that the operation cannot be continued, and a lane change cancellation state transition process S805 is executed.

When it is determined in the blind-spot reduction continuation determination S1503 that the operation can be continued, blind-spot reduction control S1504 is performed. In the blind-spot reduction control S1504, the host vehicle 81 is controlled to follow the generated blind-spot reduction trajectory.

Then, blind-spot reduction completion determination S1505 is performed. In the blind-spot reduction completion determination S1505, it is determined that the vehicle is sufficiently close to the boundary lane with a target lane change destination. As a determination method, a method of using that a wheel or a vehicle side surface on the side of a host vehicle blind-spot reduction direction is at a position substantially coinciding with the boundary line is considered. When the blind-spot reduction has been completed, lane-change trajectory generation S802 is performed. When the blind-spot reduction has not been completed, S1501 is performed again. The operation after S802 is similar to that in FIG. 8.

Figure 16:
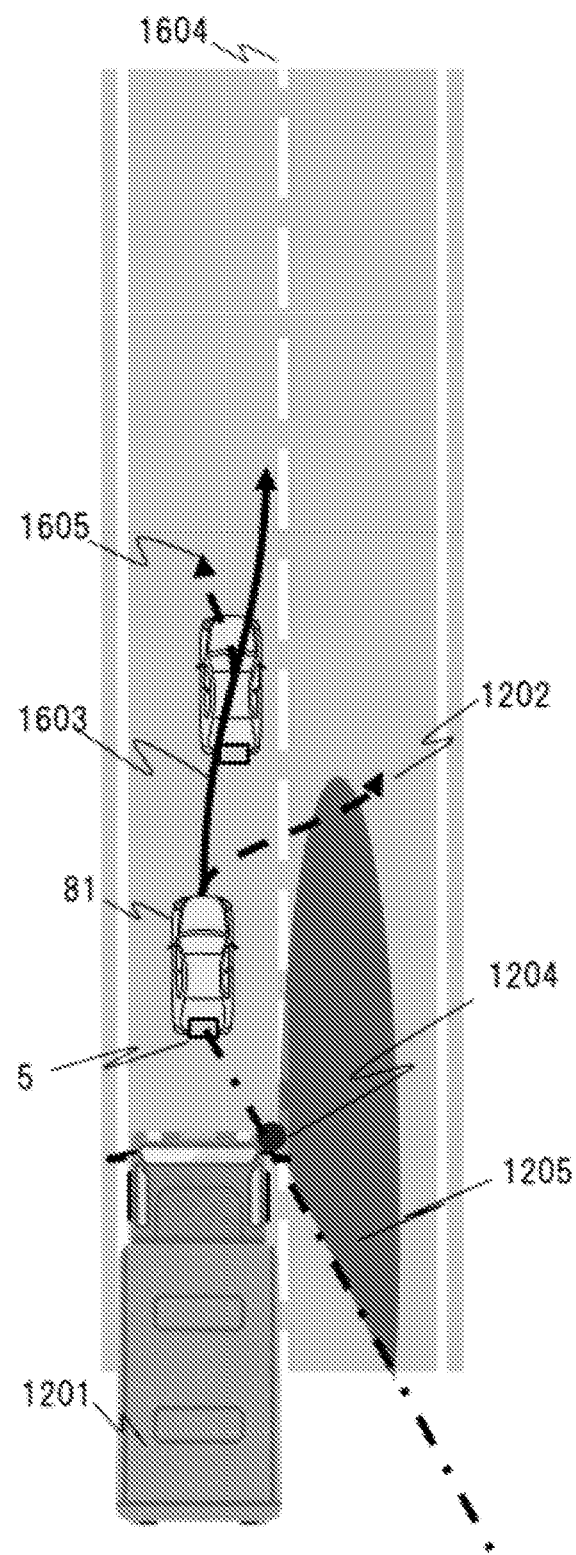
FIG. 16 is an explanatory diagram illustrating a movement of a host vehicle in Embodiment 2.

Next, the movement of the host vehicle 81 when Embodiment 2 is performed will be described with reference to FIG. 16.

When the host vehicle 81 attempts to change the lane, the lane-change trajectory 1202 is generated, but it is determined that the lane change cannot be performed based on the intersection determination with the potential risk map 1205. Therefore, by transitioning to the blind region safety check state S1301 (FIG. 13), a blind-spot reduction trajectory 1603 is generated, and the host vehicle 81 is traveling toward a lane boundary line 1604 with the lane change destination lane based on the generated trajectory. In addition, it is assumed that a cancellation trajectory 1605 is generated during performing of blind-spot reduction traveling, and the vehicle returns to the center of the original traveling lane when the blind-spot reduction traveling cannot be performed.

Figure 17:
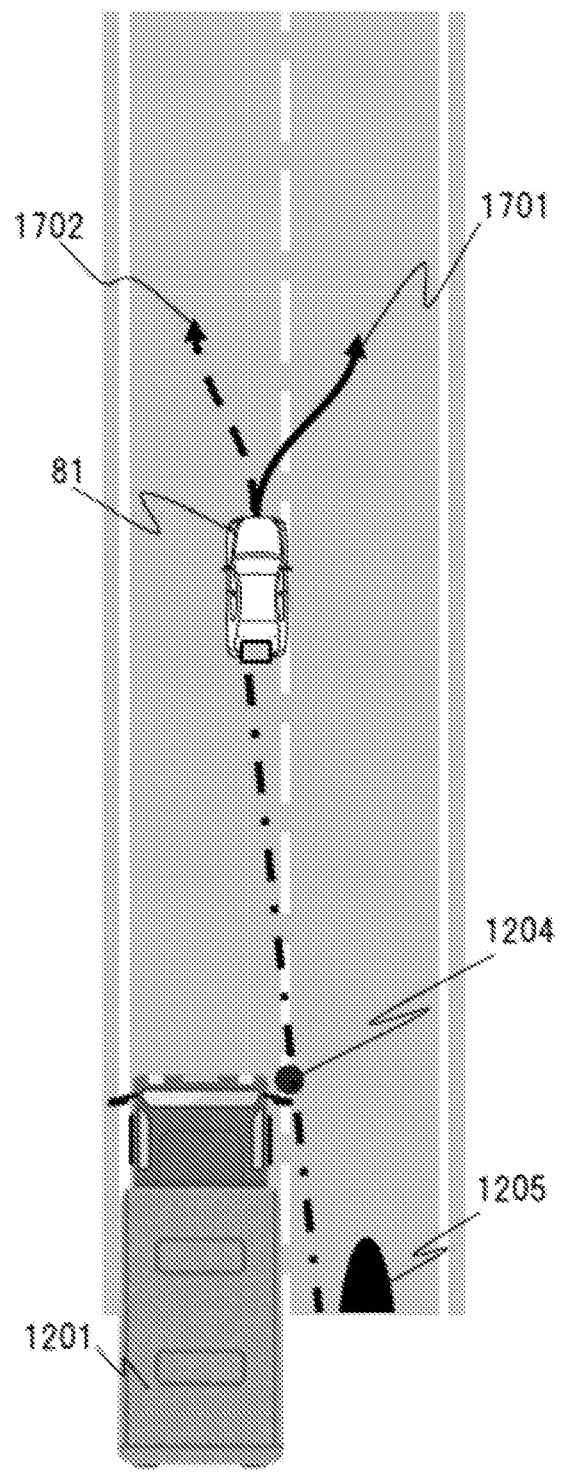
FIG. 17 is an explanatory diagram of a trajectory generated after blind-spot reduction is completed.

Next, the generated trajectory after the blind-spot reduction is completed will be described with reference to FIG. 17. As a result of the blind-spot reduction, the positional relationship with the large-sized vehicle 1201 generating the blind spot is changed, so that the potential risk region is relatively switched to the rear side of the host vehicle 81. Therefore, it may be determined that the lane change is possible when a lane-change trajectory 1701 is generated and intersection determination with the potential risk map 1205 is performed.

When it is determined that the lane change cannot be performed even in this state, a trajectory 1702 to the center of the original lane is selected, and the state returns to the original traveling position. When it is determined that the lane change is possible, the lane change is performed.

The blind-spot reduction trajectory 1603 is a trajectory for changing the trajectory of the host vehicle 81 to reduce the lateral distance between the host vehicle 81 and the lane boundary line 1604. The amount of change for reducing the lateral distance between the host vehicle 81 and the lane boundary line 1604 becomes smaller as the speed of the host vehicle 81 increases.

Figure 18:
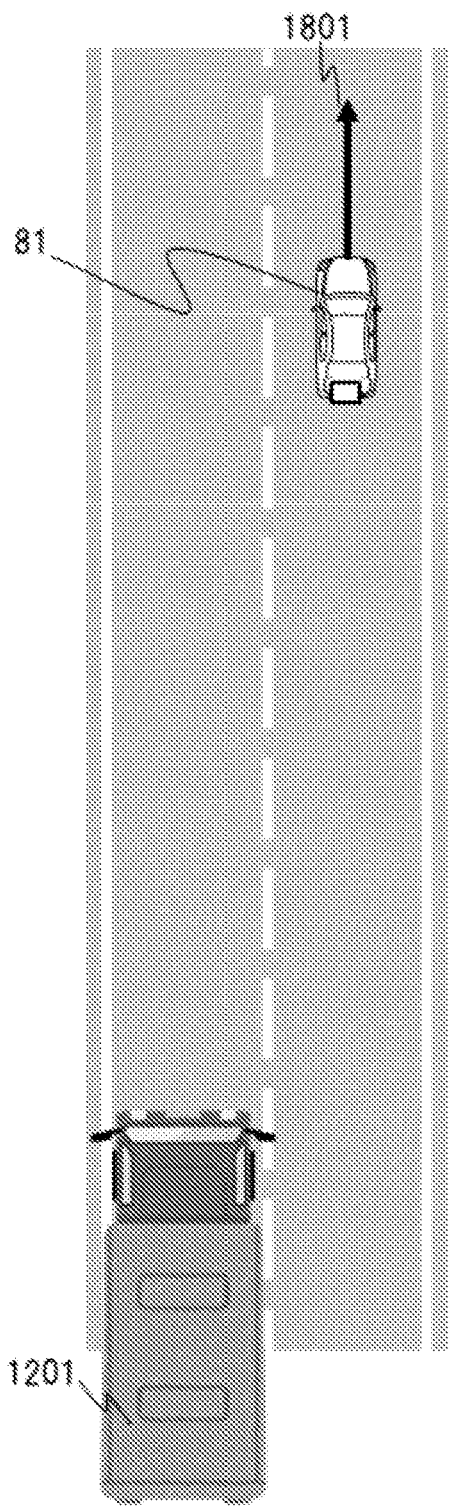
FIG. 18 is an explanatory diagram of a state when lane change has been completed.

Next, a state when the lane change has been completed will be described with reference to FIG. 18. When the lane change has been completed, a trajectory 1801 for following the lane change destination lane is generated to perform the lane following. When it is determined that the lanes coincide with each other in the lane change completion state S703 (FIG. 13), it is determined that the lane change has been completed.

In this manner, by changing the position of the host vehicle 81 in a direction of reducing the blind spot, the intersection between the region of the potential risk map 1205 and the lane-change trajectory is eliminated. Thus, even when the lane change is impossible due to the existence of the blind spot, the lane change is possible, and it is expected that the convenience of the lane change function is improved.

According to Embodiment 2 of the present invention, it is possible to obtain the same effects as those of Embodiment 1, and to improve the convenience of the lane change function as described above.

Embodiment 3

Next, a vehicle control device 1 according to Embodiment 3 of the present invention will be described with reference to FIG. 21. The vehicle control device 1 in Embodiment 3 is different from Embodiment 2 described above in that, in the blind-spot reduction control S1504 of FIG. 15, the lane change destination lane is not substantially parallel to the current host lane (merging scene). Other components are similar to those of Embodiments 1 and 2, and thus illustration and detailed description thereof are omitted.

Figure 21:
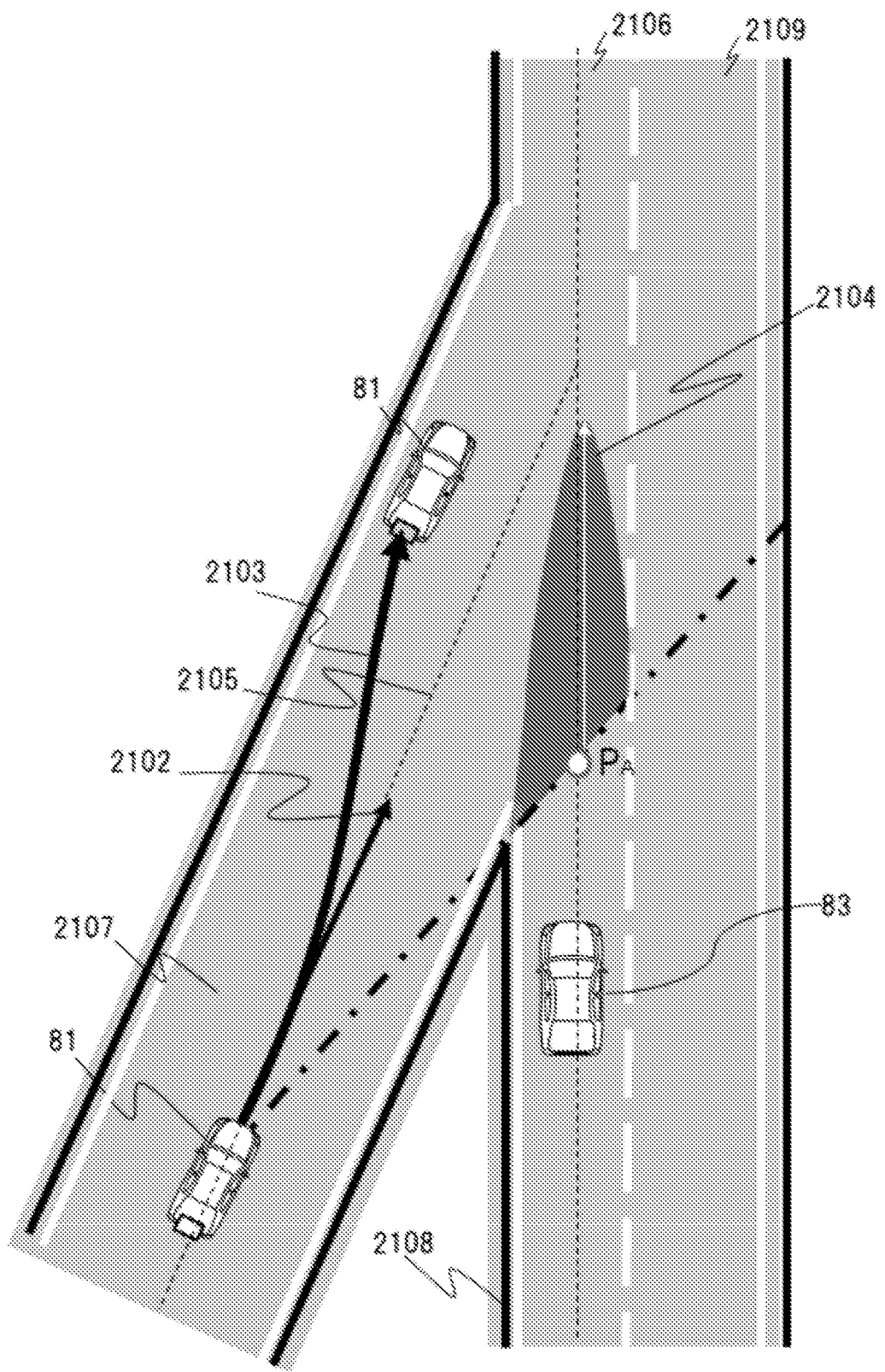
FIG. 21 is an operation explanatory diagram of a scene where a host vehicle travels in a merging lane and is about to merge into a traveling lane which is a main line, in Embodiment 3.

FIG. 21 is an operation explanatory diagram of a scene where the host vehicle 81 travels in a merging lane 2107 and is about to merge into a traveling lane 2106 which is a main line. The main lane is formed by a traveling lane 2106 and an overtaking lane 2109.

The host vehicle 81 is subjected to lane keeping control at a speed of a speed vector 2102 along a lane center line 2105 of the merging lane 2107. Here, the existence of a fence 2108 (or guard rail) causing a blind spot as a road structure causes a merging destination region of the traveling lane 2106 to be a blind spot. Therefore, the jumping-out potential risk map 2104 is generated in a region having a size of the length $L_{IRP}$ of the potential risk from the jumping-out position PA. Therefore, if the host vehicle 81 and the other vehicle 83 travel in the lane keeping as it is, the host vehicle may approach the other vehicle 83 traveling in the traveling lane 2106, and the host vehicle and the other vehicle 83 may suddenly accelerate or decelerate.

Therefore, the host vehicle 81 generates the blind-spot reduction trajectory 2103 to reduce the blind spot. A generation method will be described with reference to FIG. 22.

Figure 22:
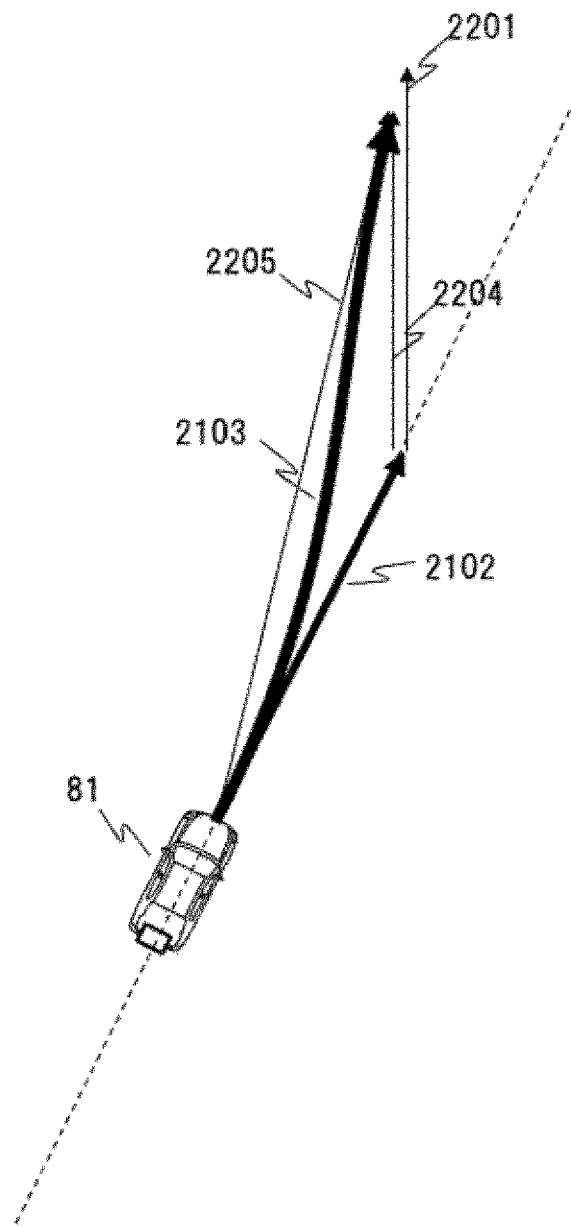
FIG. 22 is an explanatory diagram of a method for generating a blind-spot reduction trajectory to reduce a blind spot of a vehicle, in Embodiment 3.

In FIG. 22, the blind-spot reduction trajectory 2103 in the merging scene is calculated by the speed vector 2102 of the host vehicle 81 and a longitudinal direction vector 2201 of the potential risk map 2104. A proportional vector 2204 obtained by multiplying the longitudinal direction vector 2201 by k is calculated. Here, the proportional coefficient k is desirably set to become smaller as the host vehicle speed increases. That is, the proportional vector 2204 is calculated by multiplying the proportional coefficient k that decreases as the speed component of the host vehicle 81 increases. This is because, if the host vehicle 81 is controlled to greatly deviate from the lane center line of the host vehicle 81 in a state where the speed of the host vehicle 81 is high, the occupant may feel uncomfortable.

A vector sum of the vector 2204 obtained by multiplying the speed vector 2102 of the host vehicle 81 by k is calculated to calculate a blind-spot reduction target position vector 2205. Then, for the target position, the blind-spot reduction trajectory 2103 which is the target trajectory for smoothly controlling the host vehicle 81 is calculated. For example, a method of using a spline interpolation curve from the current host vehicle position with respect to the target position is considered.

With this method, by performing the blind-spot reduction control not only in the scene of the lane change to the blind-spot region occurring in a lane that is currently traveling in parallel with the lane but also in the scene of merging into the blind-spot region occurring in the main lane as in Embodiment 3, it is possible to prevent sudden approach to the other vehicle 83 that has jumped out from the blind-spot region. As a result, it is possible to prevent a sudden acceleration/deceleration of the host vehicle 81 and the other vehicle 83.

According to Embodiment 3 of the present invention, it is possible to obtain the same effects as those of Embodiment 1, and as described above, to prevent rapid acceleration/deceleration of the vehicle 81 and the other vehicle 83 even in a situation where the lane change destination lane is not substantially parallel to the current host lane (merging scene).

Note that the radar 301, the stereo camera 302, the vehicle sensor 303, and the lidar 304 can be collectively referred to as a peripheral state detection sensor that detects the peripheral state of the host vehicle 81.

As described above, according to the present invention, by preventing the unnecessary lane-change operation of the host vehicle 81, it is possible to reduce the deceleration frequency of the host vehicle 81 and the surrounding vehicles, reduce the vehicle steering amount, and suppress deterioration of the ride comfort.

That is, it is possible to realize a vehicle control device capable of suppressing an unnecessary lane-change operation of a host vehicle and suppressing deterioration of ride comfort.

REFERENCE SIGNS LIST 1 vehicle control device
2 camera (external environment recognition sensor)
3, 4 laser radar (external environment recognition sensor)
5 millimeter wave radar (external environment recognition sensor)
81 host vehicle
82 following vehicle
83 other vehicle
201 automatic driving planning unit
202 automatic parking planning unit
203 vehicle motion control unit
204 actuator control unit
205 risk map generation unit
206 vehicle network
301 radar
302 stereo camera
303 vehicle sensor
304 lidar
305 sensor information processing unit
306 map information processing unit
307 three-dimensional object behavior prediction unit
308 storage unit
309 potential risk map generation unit
310 self-location estimation processing unit
311 blind-spot object estimation processing unit
401 blind-spot region detection unit
402 blind-spot object estimation unit
500 vehicle
501 driving planning unit
502 lane keeping trajectory generation unit
503 lane-change trajectory generation unit
504 obstacle avoidance trajectory generation unit
505 trajectory arbitration unit
506 trajectory planning unit
601 lane change state management unit
602 lane change path generation unit
603 lane change speed generation unit
1603, 2103 blind-spot reduction trajectory

The invention claimed is:

1. A vehicle control device comprising:
a peripheral state detection sensor that detects a peripheral state of a host vehicle;
one or more controllers configured to:
calculate a blind-spot region around the host vehicle based on the peripheral state of the host vehicle detected by the peripheral state detection sensor and a feature amount extracted from map information, and estimate an object existing in the calculated blind-spot region and a behavior trend of the object;
generate a region having a potential risk that the host vehicle approaches the object, based on the behavior trend of the object;
generate a lane-change trajectory of the host vehicle from the peripheral state of the host vehicle and the map information, compare the generated lane-change trajectory with a potential risk map, and determine whether or not lane change of the host vehicle is possible; and
control an operation of the host vehicle in accordance with the determination of whether or not the lane change is possible; and
calculate a blind-spot reduction trajectory, and perform control such that the host vehicle travels on the blind-spot reduction trajectory upon a determination that the lane change is not possible;
wherein the blind-spot reduction trajectory is calculated based on a vector sum of a proportional vector proportional to a longitudinal vector of the blind-spot region and a target speed vector of the host vehicle.

2. The vehicle control device according to claim 1, wherein the one or more controllers are further configured to determine that the lane change is not possible, when the lane-change trajectory intersects the potential risk map.

3. The vehicle control device according to claim 1, wherein the blind-spot reduction trajectory is a trajectory for changing a trajectory of the host vehicle to reduce a lateral distance between the host vehicle and a lane boundary line.

4. The vehicle control device according to claim 3, wherein a change amount for reducing the lateral distance between the host vehicle and the lane boundary line becomes smaller as a speed of the host vehicle increases.

5. The vehicle control device according to claim 1, wherein the proportional vector is calculated by multiplying a proportional coefficient that becomes smaller as a speed component of the host vehicle increases.

* * * * *